Inventors:
Bruce A. Kaufman
Eduardo T. Ulzurrun
By Louis A Kline
John J. Mathago
Richard F. Lempel
Their Attorneys.

Inventors:
Bruce A. Kaufman
Eduardo T. Ulzurrun

By Louis A. Kline
John J. Matlago
Richard T. Lazyne
Their Attorneys.

Inventors:
Bruce A. Kaufman
Eduardo T. Ulzurrun

By Louis A. Kline
John J. Matlago
Richard J. [illegible]
Their Attorneys.

Inventors:
Bruce A. Kaufman
Eduardo T. Ulzurrun

By Louis A. Kline
John J. Matlago
Richard T. [signature]
Their Attorneys.

Inventors:
Bruce A. Kaufman
Eduardo T. Ulzurrun

By Louis A. Kline
John J. Mackay
[signature]
Their Attorneys.

April 16, 1968 B. A. KAUFMAN ET AL 3,378,823

THIN-FILM MAGNETIC MEMORY EMPLOYING COINCIDENT A.C. AND D.C. DRIVE SIGNALS

Filed Nov. 6, 1963 6 Sheets-Sheet 6

Inventors:
Bruce A. Kaufman
Eduardo T. Ulzurrun

By Louis A Kline
John J. Matlago
Richard L. Lengel

Their Attorneys.

United States Patent Office 3,378,823

Patented Apr. 16, 1968

3,378,823

THIN-FILM MAGNETIC MEMORY EMPLOYING COINCIDENT A.C. AND D.C. DRIVE SIGNALS

Bruce A. Kaufman, Los Angeles, and Eduardo T. Ulzurrun, Hollywood, Calif., assignors to The National Cash Register Company, Dayton, Ohio, a corporation of Maryland Continuation-in-part of application Ser. No. 264,532, Mar. 12, 1963. This application Nov. 6, 1963, Ser. No. 321,759

18 Claims. (Cl. 340—174)

The present application is a continuation-in-part of U.S. Patent application of Bruce A. Kaufman and Eduardo T. Ulzurrun, Ser. No. 264,532, filed on Mar. 12, 1963.

The present invention is directed to information handling systems and, more particularly, to thin film magnetic memory arrangements for storage and retrieval of information.

The increasing use and demand for computer systems have intensified the research and development efforts to improve present systems and, more particularly, to find new applications utilizing various physical phenomena and effects for digital computing systems. Electrical circuits utilizing parametrical oscillations to represent digital information is one of the developments resulting from these intensified research efforts. Recent developments of new reactive components and, more particularly, non-linear reactive components such as magnetic thin films, provide an increased incentive to explore possible applications for the phenomena of non-linear resonance. In a prior copending application having a common assignee and entitled, "Parametrical Device and Apparatus," Ser. No. 43,801, filed July 19, 1960, now Patent No. 3,361,913, by Bruce A. Kaufman, a new non-linear inductive element is utilized in novel electrical circuits for producing parametrical oscillations to represent digital information. These electrical circuits and others for producing periodic parametrical oscillations, are referred to herein simply as parametric elements. A parametric element, therefore, is a resonant circuit in which a reactive element is made to vary periodically at a rate $(2f)$ by an exciting signal which is an integral multiple of the natural resonant frequency $(f)$ of the resonant circuit in order to produce parametric oscillation at a subharmonic frequency of the exciting signal. The periodic variation in the reactive element is provided by supplying the exciting signal having a frequency $(2f)$ from a source often referred to as a "pump." In the parametric element, the parametric oscillation at the frequency $(f)$ is stable in either of two opposite phases, e.g., zero or pi radians, and the phase of oscillation is utilized to represent the binary digits, "0" and "1." For example, when parametric elements in a logical system are oscillating in the phase zero radian, a "0" binary digit is represented; and when oscillations are in the phase pi radians, a binary digit "1" is represented. Thus, the operation of the parametric element as a logical element is based on the spontaneous generation of the subharmonic oscillation which is self-starting in a resonant circuit. Since the subharmonic oscillation may occur in a parametric element at either of its two opposite phases, zero or pi radians, the control of the phase is provided by the phase of a control signal having a phase of zero or pi radians and a frequency $(f)$. This control signal is very small in amplitude in comparison to the exciting signal, and is often referred to as a "seed" signal. According to the cited example, a control signal of zero phase is coupled into the resonant circuit of the parametric element to produce subharmonic oscillations at the zero phase to represent the binary digit "0," and a control signal having a phase of pi radians is coupled into the resonant circuit of the parametric element to produce oscillations having a phase of pi radians to represent the binary digit "1."

Once the oscillation of a parametric element is established in the phase of either zero or pi radians, the phase of oscillation cannot be changed without removing the exciting signal $(2f)$ since a control voltage applied to the resonant circuit of a different phase will not affect the phase of subharmonic oscillation at the frequency $(f)$ unless the control signal is greater in amplitude that the existing signal amplitude of the subharmonic oscillation. In the parametric element, therefore, the exciting signal having a frequency of $(2f)$ is made discontinuous by modulation of the exciting signal by a periodic square wave which periodically switches the exciting signal on and off to permit the control signals to determine the phase of the subharmonic oscillations.

Synchronization for many parametric elements included in a parametrical logical system is provided by a logical clock source supplying a square wave at a desired clock rate. In response thereto, three sub-clock square waves are produced which modulate the exciting signal and produce three separate exciting signal source output signals, namely, I, II and III, during each operating cycle of the logical system. Accordingly, each operating cycle of a parametrical logical system is characterized by three exciting signal outputs which are referred to hereinafter as subclock signals and are designated subclocks I, II and III.

Having discussed the basic digital operations provided by parametric elements, the thin film magnetic memory of the present invention will be briefly described. While the memory of the present invention is particularly suitable for use with parametrical logical systems to provide a high speed electronic computer system, it should be made clear that the invention is suitable for other logical systems in which binary states are indicated by two different levels of voltage or current amplitudes, for example. It also should be noted that the operation of the magnetic memory itself does not operate in the same manner as a parametric element but does operate in a very advantageous manner with logical systems employing parametric elements due to the fact that the inputs and outputs of the memory are directly useable in parametrical logical systems. That is, the phase of the input and output signals of the present memory determines the binary digit "0" or "1" and there is no need to provide phase to D.C. converters for the inputs and D.C. to phase converters for the outputs to convert the respective input and output signals of the memory for parametric elements of a system. Such conversion would be required when the memory of the present invention is used with logical systems employing high and low levels of voltages or currents to represent the binary states. Accordingly, it is a principal object of the present invention to provide a novel thin film magnetic memory including novel circuit arrangements for storage and retrieval of information primarily for use with parametrical logical systems and also with conventional high and low level voltage or current logical systems for performing logical operations.

In the previous discussion, it was noted that the present invention is directed to a magnetic memory employing magnetic thin films. This term, magnetic thin films, specifies films which exhibit single domain characteristics. The advantageous manner in which the present invention employs these magnetic thin films is presented in the following discussion. Computer systems or information handling systems, in most instances, include a fast access memory for storing binary information to be utilized in the logical operations for processing information. The information to be processed must be readily accessible to provide for high speed operation of the computer systems. It is well known in the information handling and data processing art, that magnetic memories, usually in the form of coordinate array matrices, have made extensive use of toroidal magnetic cores as magnetic memory elements for fast access memories. In general, the logical operations are performed at faster rates than the information to be logically operated upon can be accessed from the magnetic memory, and therefore, a higher speed magnetic memory element and memory is desired. The thin film magnetic memory element provides for higher speed operation than the magnetic cores since the thin film is capable of higher switching speeds for storing the binary digital states. The cylindrical thin film provides advantages over the flat thin film and one of these advantages is that it is readily adaptable into coordinate memory arrays. The cylindrical thin magnetic film is deposited on a conductor substrate to provide a continuous cylindrical thin film of magnetic material and preferably on a beryllium-copper conductor substrate. This magnetic element is referred to herein as a magnetic rod. The cylindrical structure of the magnetic rod permits the use of multiple turn windings at each of individual binary digit or bit positions and a single magnetic rod provides for many of such digit positions as compared to a core which provides for only one digit storage position. In the memory of the present invention, a group of four magnetic rods are serially interconnected in a digit plane, and a plurality of separate digit planes in a three-dimensional coordinate array provides for storage and retrieval of a word comprising a plurality of digits. Selection of a plurality of digit positions forming a word for reading or writing operations is provided by selection of a set of coordinates of the array wherein each set of coordinates selects a plurality of serially connected solenoid windings coupled to a plurality of magnetic rods in different digit planes and disposed in a word plane.

In the thin film magnetic memory of the present invention, a magnetic rod provides advantages in that each rod conductor thereof is used both as a drive line and a sense line. During periods of writing, the rod conductor is used as a drive line and during the periods of reading the rod conductor is used as a sense line. Therefore the present invention, in addition to eliminating the need for the additional solenoid windings for sensing during read periods, also eliminates the delay in inductance of long solenoid winding sense lines which produces serious limitations in speed in large size memories.

Further, in accordance with the present invention, two separate successive series of unipolar pulses or unipolar pulse trains are provided for a memory read operating cycle which includes both read and restore operations. The restore operation in a read operating cycle follows the read operation to restore the magnetization states of the digit positions after readout. The read pulses are delayed 90° at the frequency ($f$). The delayed read pulses are then applied to a group of solenoid windings at the digit positions of any single selected word to induce digit sense signals of the word in the rod conductors of the respective digit planes. The read pulses are delayed 90° to compensate for the phase shift of the sense signals produced in the inductive coupling between the solenoid windings and the respective rod conductors. The rod conductors are connected to the inputs of respective memory input-output flip-flops to couple the sense signals thereto for storing the digits of the selected word read from the memory. As noted above, each read operating cycle of the memory includes a restore operation which comprises a complete write operation in that the word read from the memory is written back into the selected word position. A write operation provides for both a series of write-unipolar pulses and write A.C. digit currents to be applied to the digit positions of a selected word in a word plane. A word plane is defined as a plurality of magnetic thin film elements that are coupled or intercoupled to store a word. A digit plane is defined as one or more thin film elements coupled or intercoupled to supply sense signals during read operations and receive an A.C. current with phase information during writing operations. During the write operation, the A.C. digit currents are supplied from the respective memory input-output register flip-flops to the magnetic rod conductors of the digit planes and the write-unipolar pulse train is supplied to the solenoid windings at the digit positions of any single selected word.

In the thin film magnetic memory of the present invention, the unipolar pulses are preferably shaped to be narrow and of short time duration relative to the time duration of one-half cycle of the A.C. digit currents. The shaped unipolar pulse provides definite advantages over prior arrangements in that the unipolar pulses increase the speed of response and avoid switching of magnetization states at unselected digit positions of the memory and minimize or eliminate "creeping" of the magnetization during read operations. Also, during write or restore operations, high speed operation is obtained by unipolar pulses and rotational switching by transverse magnetic fields, i.e., one cycle of the A.C. digit currents.

The magnetic memory of the present invention is disclosed hereinafter by separate circuit arrangements for providing read and write-unipolar pulse trains including a dual frequency circuit arrangement and a single frequency circuit arrangement. In the dual frequency circuit arrangement, the frequency (pulse repetition rate) of the read and write pulses is one-half ($f/2$) of the subharmonic oscillation frequency ($f$). In the single frequency circuit arrangement, the frequency (pulse repetition rate) of the read and write pulses is the same as the subharmonic oscillation frequency ($f$).

Accordingly, it is an object of the present invention to provide a memory having the foregoing features and advantages which provides for higher speed operation and prevents undesired switching of magnetization states of digit positions in a memory during readout and minimizes or eliminates "creeping" of magnetization during readout.

Another object of the present invention is to provide an improved magnetic thin film memory for fast access and storage of information.

A further object of the present invention is to provide a memory in which unipolar pulses produce a unidirectional magnetic field, an A.C. signal produces an A.C. magnetic field and the unidirectional and A.C. magnetic fields are combined for writing information into a magnetic thin film.

Still another object of the present invention is to provide narrow unipolar pulses to control the magnetic field applied to a magnetic thin film.

A further object of the present invention is to provide a combination of narrow write-unipolar pulses and write A.C. current to accurately control the switching of the magnetic thin film.

Another object of the present invention is to provide a high frequency memory for storage of binary digits represented by A.C. digit signals in which a simple coordinate selection circuit is capable of addressing any word in the memory.

A further object of the present invention is to provide unipolar pulses for accessing information from a magnetic memory and the combination of simultaneous unipolar pulses and A.C. currents to produce combined and mutually transverse magnetic fields for rotational switching of the magnetization state of an anisotropic magnetic thin film for storing information in a magnetic memory.

A still further object of the present invention is to provide unipolar pulses for a magnetic memory for storing and accessing A.C. digit signals to simplify selection circuitry for the memory matrix.

Another object of the present invention is the provision of a single frequency thin film magnetic memory wherein the frequency of the A.C. digit signals is the same as the repetition rate of the read and write pulses.

Still another object of the present invention is to provide an improved magnetic rod memory having one or more of the aforementioned features and advantages.

Other objects and features of the present invention will become apparent to those skilled in the art as the disclosure is made in the following detailed description of the thin film magnetic memory of the present invention as illustrated in the accompanying sheets of drawings, in which:

FIG. 1 is a schematic diagram, partly in block diagram, for illustrating the magnetic rod memory of the present invention;

FIG. 2*a* is a perspective view of a portion of a typical magnetic rod which rod has been greatly enlarged and shown in section to disclose its structure according to the present invention;

FIG. 2*b* is a characteristic curve illustrating the substantially rectangular hysteresis loop of the typical magnetic rod of FIG. 2*a* along the circumferential easy axis of remanent magnetization;

FIG. 2*c* is similar to FIG. 2*b* and shows the closed hysteresis loop of a typical magnetic rod of FIG. 2*a* along the longitudinal hard axis of magnetization;

FIG. 3*a* shows the portion of the typical mangetic rod shown in FIG. 2*a* with the addition of a solenoid winding to illustrate a typical digit storage position in the memory arrangement of the present invention;

FIG. 3*b* is a diagram showing a critical curve for illustrating the switching characteristics of the magnetic rod structure shown in FIG. 3*a*;

FIG. 3*c* is an abstract diagram showing the critical curve similar to that shown in FIG. 3*b* and a curve of the combined magnetic fields which are applied to the magnetic rod structure shown in FIG. 3*a* for writing a "0" binary digit in the digit storage position during operation of the dual frequency circuit arrangement of the memory of the present invention;

FIG. 3*d* is another diagram showing the curves similar to those illustrated in FIG. 3*c* for writing a "1" binary digit in the digit storage position in the operation of the dual frequency circuit arrangement;

FIG. 4*a* is a diagram of magnetization at the typical digit position illustrating applied magnetic fields and resulting changes in magnetization of the portion of the magnetic rod shown in FIG. 3*a* during readout of a "0" binary digit from the digit position;

FIG. 4*b* is a diagram similar to FIG. 4*a* to illustrate readout of a "1" binary digit from the digit position;

Figure 1:
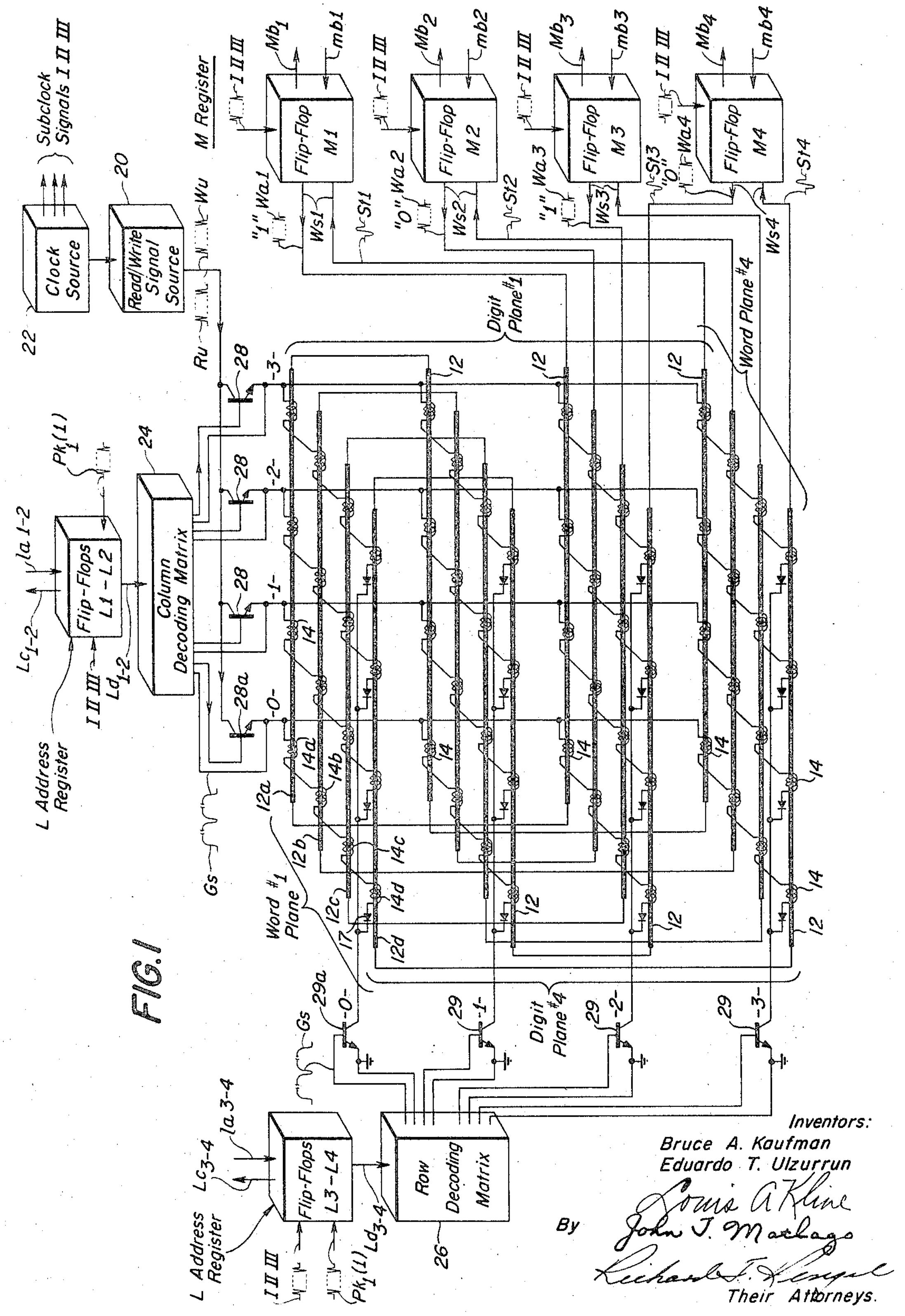
Figure 3A:
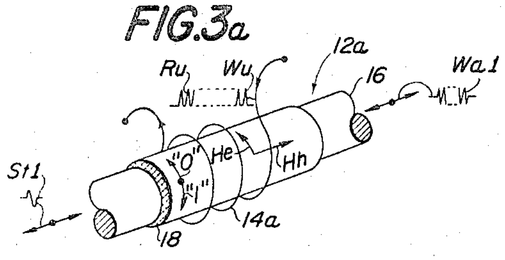
Figure 3B:
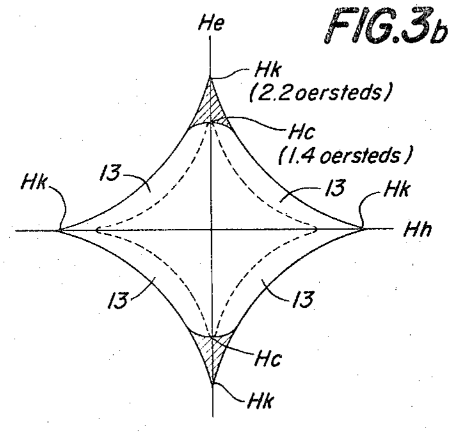
Figure 3C:
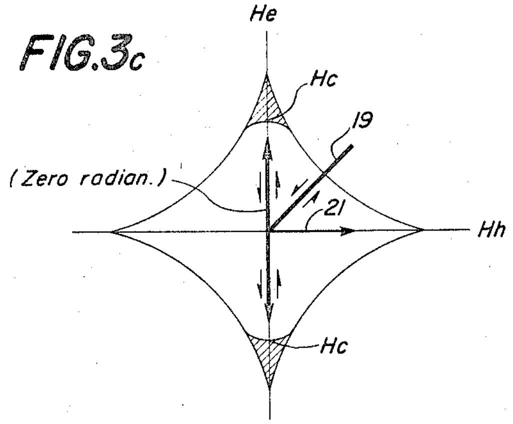
Figure 12A:
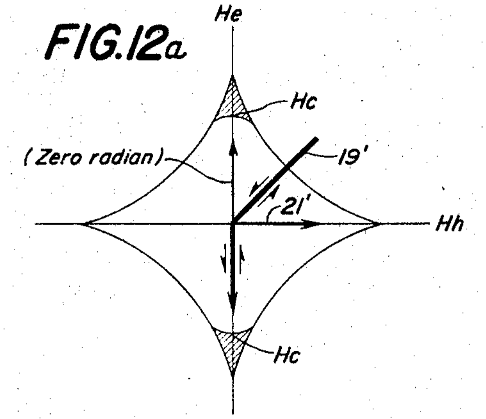
Figure 12B:
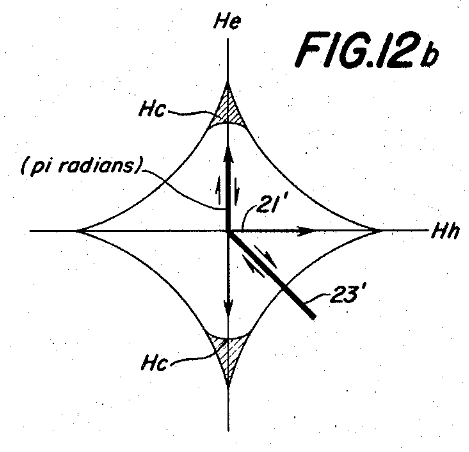
Figure 13:
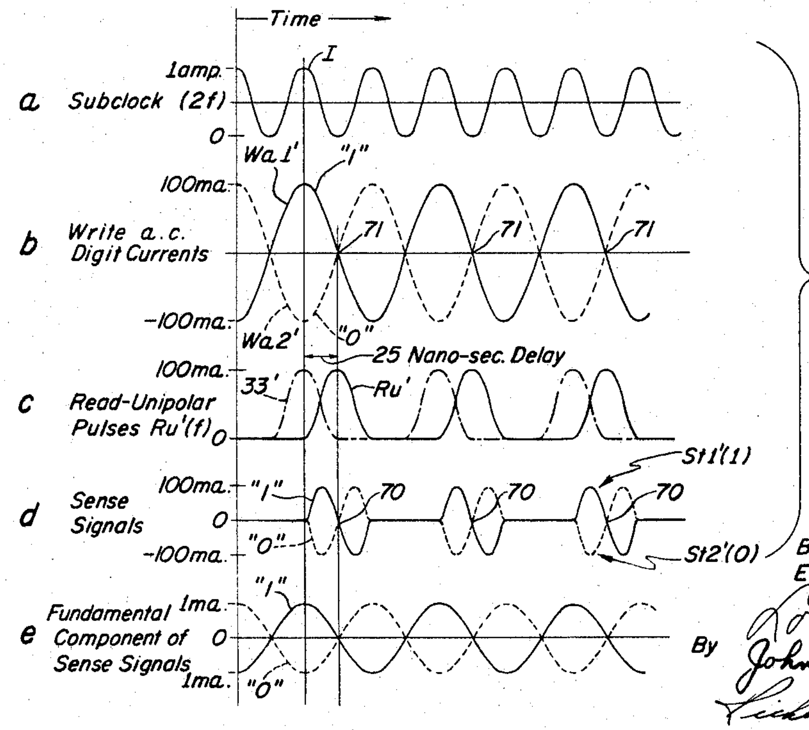
Figure 14:
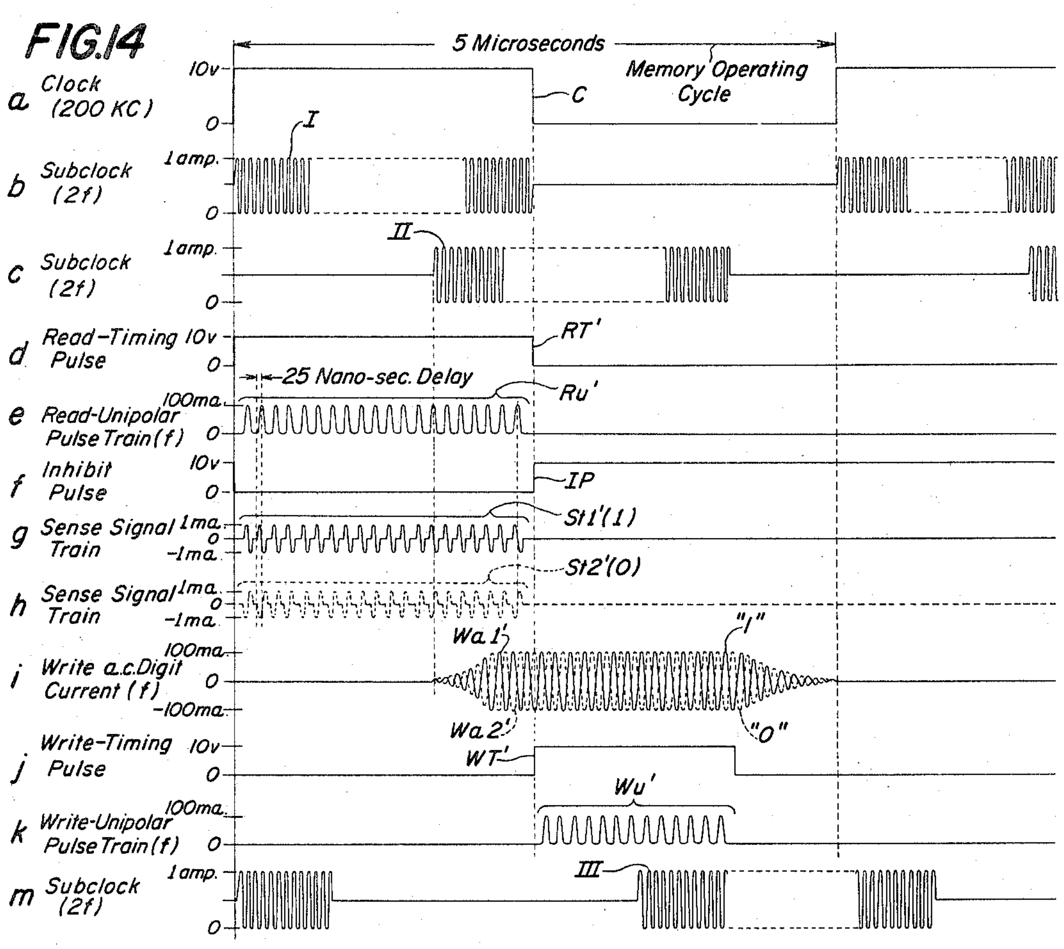
Figure 15:
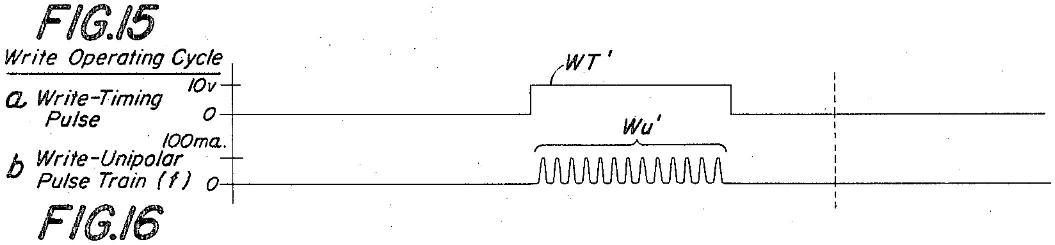
Figure 16:
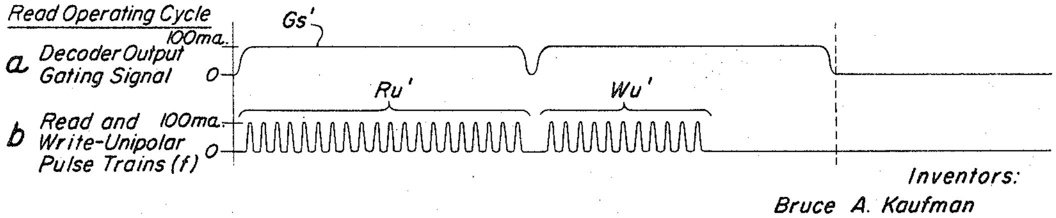

FIG. 12*a* is an abstract diagram similar to the diagram of FIG. 3*c* for showing the combined magnetic fields which are applied to the magnetic rod structure shown in FIG. 3*a* for writing a "0" binary digit in a digit storage position during operation of the single frequency circuit arrangement of the present invention;

FIG. 12*b* is another diagram similar to the diagram of FIG. 12*a* for showing the combined magnetic fields for writing a "1" binary digit in a digit storage position during operation of the single frequency circuit arrangement of the present invention;

FIG. 13 is a diagram showing typical waveforms produced during operation of single frequency circuit arrangement of the memory of FIG. 1 which waveforms have been enlarged to clearly show the phase relationships thereof;

FIG. 14 is a diagram showing typical waveforms produced by the magnetic memory of FIG. 1 including typical waveforms produced by the single frequency circuit arrangement during a read (and restore) operating cycle;

FIG. 15 is a diagram showing selected typical signal waveforms produced by the memory of FIG. 1 including typical waveforms of write pulse trains produced by the single frequency circuit arrangement during a write operating cycle; and FIG. 16 is a diagram showing typical signal waveforms produced by the decoding matrices of FIG. 1 to pass the trains of read and write-unipolar pulses to the solenoid windings of an addressed word of the memory of FIG. 1 including typical waveforms of read and write pulse trains produced by the single frequency circuit arrangement.

*General description of the memory (FIG. 1)*

Referring now to the drawings, the present invention is shown in FIG. 1 and comprises a magnetic rod memory arrangement including an array of sixteen magnetic rods 12 and four multi-turn solenoid windings 14 wound on each of these magnetic rods. As shown, the magnetic rods 12 are arranged in a three-dimensional array to provide four (horizontal) word planes #1–#4 and four (vertical) digit planes #1–#4. The four magnetic rods 12 in each of the vertical digit planes #1–#4 are interconnected to provide a combined write and sense signal current path for storage and retrieval of binary digits "1" and "0" in sixteen digit storage positions of each digit plane. In a horizontal word plane, e.g., word plane #1, the magnetic rods 12*a*, 12*b*, 12*c* and 12*d* are intercoupled by four groups of serially interconnected solenoid windings 14, e.g., windings 14*a* to 14*d*. Each solenoid winding 14 and each corresponding portion of the magnetic rod 12 comprises a digit storage position in the memory and each group of four serially interconnected solenoid windings 14 and each of the corresponding portions of the magnetic rods 12 comprise a word storage position, e.g., word storage position 0–0 includes windings 14*a* to 14*d*. Any word storage position of the sixteen word storage positions of the memory arrangement shown in FIG. 1 is capable of being selected by setting L Address Register flip-flops L1–L2 and L3–L4. In an operating cycle of the memory of FIG. 1, any single word storage position is selected by setting the L Address Registers and applying read and write-unipolar pulse trains R*u* and W*u* from read/write signal source 20 to the four serially interconnected solenoid windings 14 of the selected word storage position, e.g., selection of word lines –0– and –0– in a memory operating cycle applies read and/or write-unipolar pulses R*u* and W*u* to solenoid windings 14a, 14b, 14c and 14d at word storage position 0–0. In a read operating cycle, for example, the four binary digits "1010" stored at digit storage positions of the selected word storage position 0–0 are read out into respective flip-flops M1 to M4 comprising the memory input-output M Register. The operation of the present magnetic rod memory arrangement is described in detail in subsequent related portions of the present disclosure.

*Detailed description of the memory (FIG. 1)*

Figure 8:
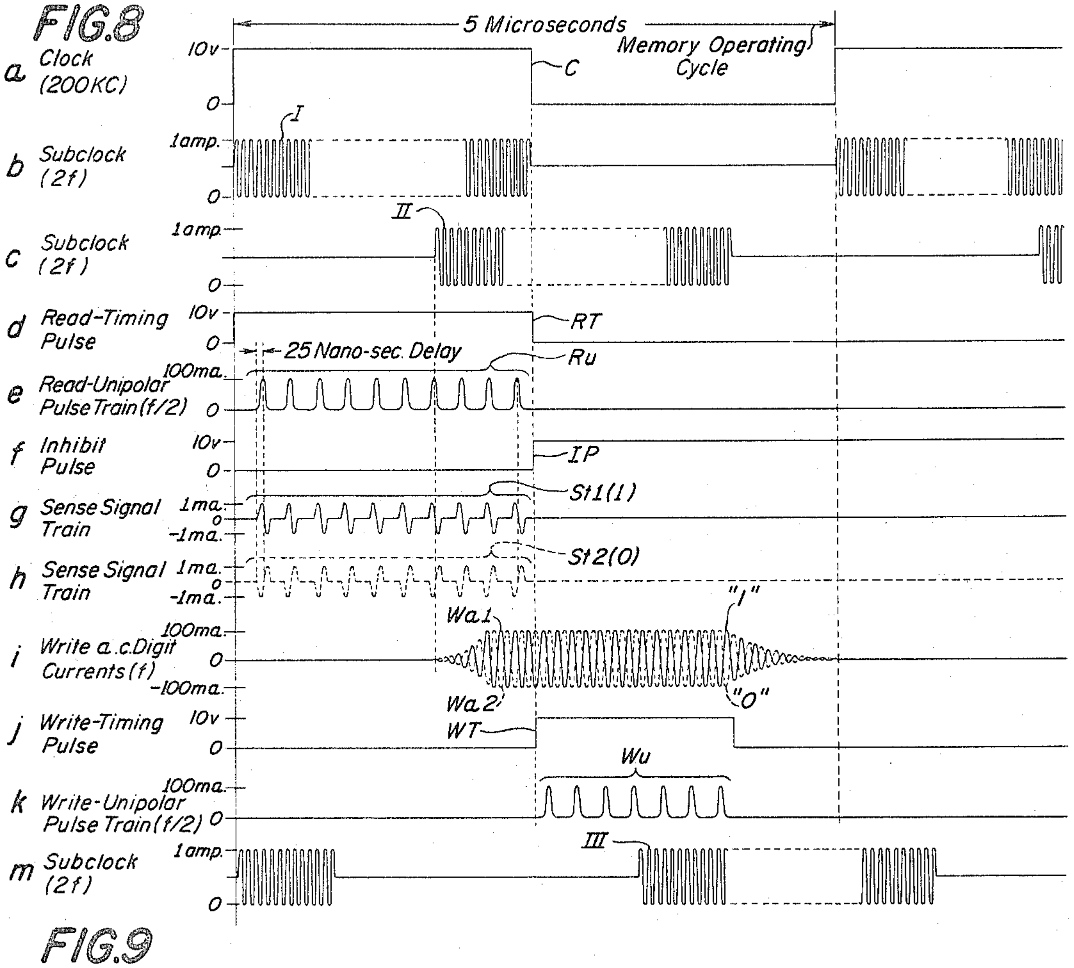
FIG. 8 is a diagram showing typical signal waveforms produced by the magnetic memory of FIG. 1 including typical waveforms produced by the dual frequency circuit arrangement during a read operating cycle.

The magnetic rod memory arrangement shown in FIG. 1 is synchronized by a clock source 22 generating clock pulses C at, for example, a 200 kilocycle clock rate. Typical signal waveforms for synchronous operation are shown in FIG. 8 which shows the clock pulses C (FIG. 8a) that are generated to provide synchronous operation at the 200 kilocycle rate. At this clock rate, an operating cycle has a time period of five microseconds. The clock source 22 is not intended necessarily to be restricted in its use to the memory but is capable of providing clock pulses C and subclock signals I, II and III to an entire parametric computer system of which the present invention provides a fast access memory for storage and retrieval of information for use in computing. The clock source 22 comprises a sinusoidal signal wave generator producing a twenty megacycle signal (2f) which is modulated to produce twenty megacycle (2f) subclock signals I, II and III illustrated in FIGS. 8b, 8c and 8m, for example, in a manner disclosed in the cited copending application (Ser. No. 43,801). The subclock signals I, II and III are supplied to the flip-flops L1 to L4 of the L Registers and flip-flops M1 to M4 of the M Register shown in FIG. 1 and, in addition, an unmodulated twenty megacycle (2f) signal is supplied to the read/write signal source 20 to generate the read and write-unipolar pulse trains Ru and Wu in a manner to be disclosed in detail later in the description of FIG. 5 for the dual frequency circuit arrangement and FIG. 11 for the single frequency circuit arrangement.

Proceeding with the description of FIG. 1 and passing over until later the details of the manner in which the read and write pulse trains Ru and Wu are generated, these read and/or write pulse trains are coupled to the group of four serially connected solenoid windings 14 at any one addressed word position (e.g., word position 0–0) by coordinate selection of a current path therethrough. During each memory operating cycle in which the read-unipolar pulse train Ru is coupled to a selected word position, a sense signal train St1 (e.g., St1(1) as shown in FIG. 8g) is induced in the magnetic rods 12 at each digit position of the selected word. Since the digit positions of any selected word are in separate digit planes #1–#4, sense signal trains St1 to St4 (FIG. 1) are coupled to combined sense inputs and write outputs WS1 to WS4 (FIG. 1) respectively to store the binary digits (for example, "1010") in the flip-flops M1 to M4, respectively.

Each read operating cycle of the memory of FIG. 1 includes a read operation and a subsequent write (restore) operation in the same cycle. In the separate circuit arrangements of the magnetic memory, the selection of any word position (e.g., word position 0–0) is retained throughout the memory operating cycle so that the write-unipolar pulse train Wu, which is generated each read operating cycle, is applied to the solenoid windings 14 of the selected word position (e.g., word position 0–0) to write back the binary digits (e.g., "1010") read out during the read operation of the same memory cycle. In addition to the write-unipolar pulse train Wu provided for each write operation, write A.C. digit currents Wa1 to Wa4 are supplied to the magnetic rods 12 in the respective digit planes #1–#4, to write the binary digits into the respective digit positions. The write A.C. digit currents Wa1 to Wa4 are supplied for each write operation by the flip-flops M1 to M4 only during the time period of subclock II, e.g., digit current Wa1 as shown in FIG. 8i. The combination of a write-unipolar pulse train Wu and write A.C. digit currents Wa1 to Wa4 at an addressed word position causes the binary digits to be restored in the respective digit positions in the addressed word position from which the digits were accessed.

A write operating cycle comprises a write operation only (store) and does not include a read operation (readout). The write operation is similar to the write (restore), operation, described supra, except that the binary digits being stored have not been read out of the memory in the write operating cycle being considered but are any binary digits which are stored in the flip-flops M1 to M4 during the time period of the write operation, i.e., during the time period of the subclock II in the write operating cycle.

From the foregoing, it is clear that the binary digits stored in flip-flops M1 to M4 are written into the respective digit positions of any addressed word position selected during a memory operating cycle whether the memory operating cycle is a read or a write operating cycle. During a read operating cycle, the binary digits read out of the memory into flip-flops M1 and M4 are written back at the same address in order to be restored to the respective digit positions of the word position selected for the memory operating cycle.

Figure 10:
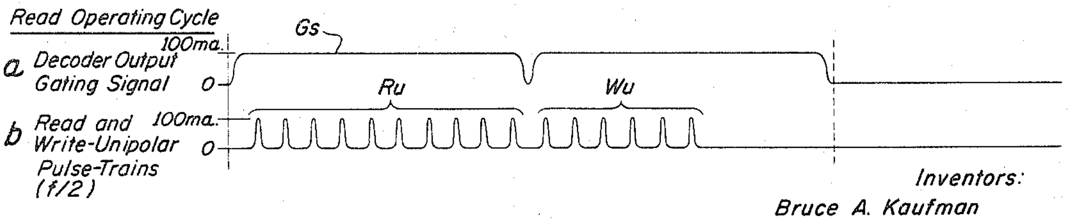
FIG. 10 is a diagram showing typical signal waveforms produced by the decoring matrices to pass the read and write-unipolar pulse trains to any selected group of four solenoid windings of an addressed word storage position of the memory shown in FIG. 1 including typical waveforms of read and write pulse trains produced by the dual frequency circuit arrangement.

As shown in FIG. 1, address and selection circuitry is provided for selection of any word position for read and write operating cycles. This circuitry includes the L Address Registers which are shown to comprise the flip-flops L1–L2 and L3–L4. The setting of these flip-flops determines the word position and the group of four solenoid windings 14 which are selected for passing read and write-unipolar pulses for read and write operations. This selection is accomplished by applying phase to D.C. converted outpsuts of L Address Registers ($Ld_{1-2}$ and $Ld_{3-4}$) to the column decoding matrix 24 and row decoding matrix 26, respectively. From the detailed description of FIG. 7, infra, it will be seen that the decoding matrices are diode matrices having pulse forming circuits in the outputs thereof to produce gating signals Gs (FIG. 10a) for passing the read and write-unipolar pulse trains Ru and Wu. The gating signals Gs that are supplied from the column decoding matrix 24 are applied to any selected one of the column (NPN) transistors 28; and the gating signals Gs that are supplied from the row decoding matrix 26 are applied to any selected one of the row (NPN) transistors 29 to provide a single selected current path through the group of four solenoid windings 14 of any selected word position. For example, gating signal Gs applied to the base of the column transistor 28a and to the emitter of the row transistor 29a pass read and write pulse trains Ru and Wu through solenoid windings 14a to 14d at the word position 0–0 during a read operating cycle and pass write pulse train Wu during a write operating cycle. In operation, the passing of a read pulse train Ru through solenoid windings 14a to 14d at word position 0–0, for example, produces sense signal trains St1 to St4 at the inputs Wa1 to Wa4 during readout, to store the binary digits "1," "0," "1" and "0," as shown in FIG. 1, for example, in flip-flops M1 to M4, respectively. In passing, it should be noted that the row transistors 29 are shown having their emitters connected to ground. While this circuit arrangement lends itself to clarity in discussion, it is often desirable to return the emitter to the output of the read/write signal source 20, e.g., to the return side of an output transformer (not shown) of an amplifier 44 (FIG. 5) whereby a "floating" signal level is provided instead of a ground reference level as shown in FIG. 1. Also to be noted is that decoding matrices 24 and 26 employ diode logical circuitry rather than parametrical logical circuitry because the parametrical logical circuitry is slower than the diode logical circuitry used in the present magnetic memory of the present invention. Thus, the delay in accessing a word at any address is minimized.

Referring now more particularly to the circuit arrangement of the digit planes #1–#4, the magnetic rod memory arrangement of the present invention of FIG. 1 has been described as including sixteen magnetic rods 12 comprising rod conductors 16 on which magnetic thin film 18 (FIG. 2*a*) has been deposited. As shown in FIG. 1, the magnetic rods 12 in each digit plane are connected to form a line with a short circuited end. The write A.C. digit currents *Wa*1 to *Wa*4, having sinusoidal waveforms, are supplied to respective groups of four magnetic rods 12, and a standing wave with a maximum current at the shorted end is maintained throughout, i.e., the ratio of maximum to minimum current is approximately one. Thus, the length of each line, i.e., the total length of either two of the magnetic rods 12 in each group comprising a digit plane, is less than a quarter wavelength of the ten megacycle signal (approximately 7 meters) and the current ratio of I max. to I min., along the total length of magnetic rods 12 in any of the digit planes #1–#4, is maintained near one.

The reason for providing a short circuited line for each digit plane consisting of four rods 12 is that the characteristic impedance of the line is on the order of 300 ohms. If the line is terminated by the characteristic impedance, then the input impedance as seen by the output of power parametric element (e.g., *Mb*1 shown in FIG. 6) should be about 300 ohms assuming an ideal (transmission) line. The power required to drive this latter (transmission) line would be large, which in turn, would require expensive drivers and more power output from the power parametric element. As shown in FIG. 1, with the line short circuited, the input impedance is primarily reactive, i.e., inductive with a small resistive component due to the losses in the (transmission) line.

The provision of a standing wave for a group of four magnetic rods 12 (digit plane) has the advantage of providing a standing wave along the total length which is of the same phase at all points along the total length. The amplitude changes, as indicated before, are well within the tolerances of the system to provide for uniform magnetization at each digit position in any digit plane.

The circuit arrangements of the four magnetic rods 12 in each of the digit planes #1–#4 are different to provide alternate digit planes which are balanced transposed (digit planes #1 and #3) and balanced non-transposed (digit planes #2 and #4) magnetic rod transmission lines. Balanced transposed lines in digit planes (#1 and #3) provide noise cancellation of extraneous signals from external sources which have not been shielded from the memory array. However, because of the close proximity of magnetic rods 12 of adjacent digit planes, the non-transposed arrangement of magnetic rods 12 in alternate digit planes (#2 and #4) minimizes interaction between digit planes #1–#4. By minimizing interaction, the possibility of the ten megacycle (*f*) write A.C. digit current supplied to one digit plane controlling the output of the adjacent digit planes is minimized if and when there is a difference in timing of the digit current supplied to adjacent digit planes. Accordingly, digit plane #4 is a balanced non-transposed transmission line and the next adjacent digit plane #3 is a balanced transposed transmission line and so forth. It should be noted that when the digit plane includes six (6) or more magnetic rods 12 (not shown), each of the alternate digit planes is mixed, transposed and non-transposed instead of completely non-transposed.

*Magnetic rod digit positions (FIGS. 2a to 4b)*

Figure 2A:
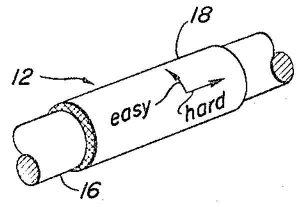
Figure 2B:
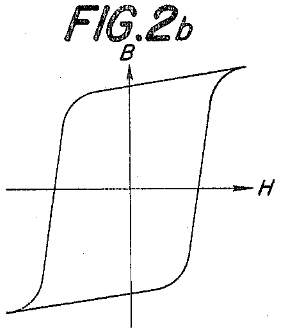
Figure 2C:
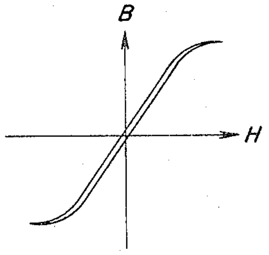

In FIG. 2*a*, a typical section of the preferred magnetic thin film storage device, i.e., the magnetic rod 12*a*, is shown to comprise a cylindrical beryllium-copper substrate or rod conductor 16 of approximately .01 inch in diameter having a permalloy magnetic thin film 18 of low coercivity comprising a nickel-iron (Ni-Fe) alloy preferably 80% to 82% nickel, 18% to 20% iron and a trace of phosphorous (acid or hypophosphite) which is electrodeposited on the rod conductor 16. The thickness of the magnetic thin film 18 is approximately ten thousand angstroms (10,000 A.) or less. While the magnetic thin film 18 is being deposited on the rod conductor 16, a magnetic field is produced in the area of electrodeposition, the known effect of which is to produce anisotropic properties in the magnetic thin film 18. In the preferred and well known manner therefor, a current is passed through the conductor to produce a magnetic thin film 18 having circumferential remanent magnetization, i.e., anisotropic properties, by a circular magnetic field about the rod conductor 16. As shown in FIG. 2*a*, an easy axis of remanent magnetization is produced longitudinally and in the cylindrical magnetic thin film 18. In FIGS. 2*b* and 2*c*, typical hysteresis loops are shown for the anisotropic cylindrical thin film 18 in which an applied circumferential alternating magnetic field produces the rectangular hysteresis curve shown in FIG. 2*b* and an applied alternating magnetic field in the longitudinal direction produces a substantially closed hysteresis curve shown in FIG. 2*c*. This thin film exhibits single domain characteristics.

Referring now to FIG. 3*a*, a section of the magnetic rod 12*a* shown in FIG. 2*a* is shown along with the solenoid winding 14*a* which combination comprises a typical digit position of the preferred magnetic rod memory arrangement of FIG. 1. A write operation is capable of changing the binary state at this digit position to store a binary digit "1" or "0" therein by write A.C. digit current *Wa*1 and write-unipolar pulse train W*u* which are simultaneously applied to the rod conductor 16 and solenoid winding 14*a*. An alternating magnetic field along the easy axis (H*e*) is applied to the rod 12*a* in response to a ten megacycle signal (*f*), e.g., the write A.C. digit current *Wa*1 that is applied to the rod conductor 16 as indicated in FIG. 3*a*. A transverse magnetic field is produced along the hard axis (H*h*) by the write-unipolar pulse train W*u* which is supplied to the solenoid winding 14*a*. The phase of pi radians of the write A.C. digit current *Wa*1 and pulse train W*u* will result in rotational switching and remanent magnetization along the easy axis in the direction as shown, to store the binary digit "1" for example. The multi-turn solenoid winding 14*a*, shown schematically as having three turns, is preferably a solenoid winding having ten turns and wound at a rate of approximately seventy-eight turns per centimeter to provide a high concentrated magnetic field intensity in the thin film at the digit position for a given current level. As shown in FIG. 3*a*, either a binary digit "0" or binary digit "1" is stored by respective remanent magnetization states along the easy axis and in the magnetic thin film 18. The resulting remanent magnetization state is determined during any writing period, when a write-unipolar pulse train W*u* is applied to the solenoid winding 14*a* and a write A.C. digit current *Wa*1 of either the phase zero or pi radians is applied to the rod conductor 16. The manner in which combined alternating and transverse magnetic fields, produced by write A.C. digit current *Wa*1 and write-unipolar pulse train W*u*, switches the state of remanent magnetization of the magnetic rod 12*a* (along the easy axis H*e*) to store the binary digits "1" and "0" can be understood from the description of critical abstract diagrams including switching curves (astroids) shown in FIGS. 3*b*, 3*c* and 3*d* for the dual frequency circuit arrangement and FIGS. 3*b*, 12*a* and 12*b* for the single frequency circuit arrangement.

In FIG. 3*b*, the critical curve is shown to form an astroid (solid line). This is an idealized critical curve for domain rotation as is well known, and generally it can be stated that applied magnetic fields which cross the critical curve are capable of producing domain rotation. Also, magnetic fields having a resulting magnitude greater than H*e* which thereby project into the shaded areas are capable of producing switching of the remanent magnetization by domain wall motion. Furthermore, any magnetic field or combination thereof having a magnetizing force crossing the dashed line into a "creeping" zone 13, which is the area between the critical curve and the dashed line, is capable of altering the remanent magnetization state but generally without producing complete switching. While the magnetic rod 12*a* does not necessarily follow the idealized critical curve of FIG. 3*b*, this will serve as a basis for explanation of the reading and writing operations including the rotational switching of the magnetization state of the magnetic rod 12*a* at the digit position shown in FIG. 3*a* since the critical curve of the magnetic rod 12*a* follows this idealized curve as shown with deviations resulting from different modes of operation and composition and structure of the actual thin films on the magnetic rod 12*a*. For example, the coercivity (H*e*) of the magnetic thin film 18 of the magnetic rod 12*a* is approximately 1.4 oersteds and the anisotropy (H*k*) is approximately 2.2 oersteds. In practice, however, the switching of magnetization states has been found to occur indicating that the critical curve crosses the hard axis (H*h*) at approximately 7 oersteds instead of the 2.2 oersteds corresponding to H*k*. The magnetic memory of the present invention is not limited to this particular mode of operation, as will be apparent from the description which follows, and the critical curves shown in FIGS. 3*b* and 3*d* and FIGS. 12*a* and 12*b* serve to demonstrate the operation wherein switching of magnetization states occurs as a result of domain rotation and the critical curves will be modified to the characteristics of the particular magnetic thin film and the particular signals used to switch magnetization states of the magnetic thin film. For example, the composition of the magnetic thin film 18 and the manner in which it is deposited is controlled to provide for switching by domain rotation.

Figure 3D:
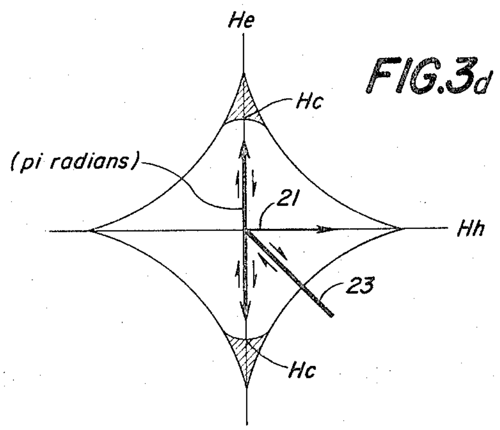

Referring now to FIGS. 3*c* and 3*d*, which is directed to the dual frequency circuit arrangement of the magnetic memory of the present invention, a heavy line 19 (FIG. 3*c*) describes the locus of points of the different magnitudes of the combined magnetic fields produced in the magnetic thin film 18. These combined magnetic fields result from write-unipolar pulse train W*u* and write A.C. digit current W*a*1 of the phase zero radian for writing the binary bit "0" in the digit position shown in FIG. 3*a* for example. In FIG. 3*d*, a typical magnetic field for storing the binary digit "1" is shown by line 23 wherein the phase of the write A.C. digit current W*a*1 (FIG. 3*a*) is pi radians. It should be appreciated that after applied magnetic fields produce a resultant magnetic field crossing the critical curve as shown in FIGS. 3*c* and 3*d*, that the magnetization vector $\overline{M}$ (FIGS. 4*a* and 4*b*) will return to the easy axis (H*e*) of remanent magnetization. Accordingly, the combined applied magnetic fields illustrated in FIG. 3*c* result in magnetization $\overline{M}(0)$ shown in FIG. 4*a* and the combined applied magnetic fields illustrated in FIG. 3*d* result in magnetization $\overline{M}(1)$ shown in FIG. 4*b*. Thus, the binary states "0" and "1" are stored by the concurrent application of two mutually perpendicular magnetic fields to the cylindrical thin film 18 of the magnetic rod 12*a* wherein an alternating magnetic field is applied along the easy axis (H*e*) and a unidirectional magnetic field is applied along the hard axis (H*h*) and at the digit position; and the combination of fields produces the combined magnetic fields for rotational switching. Depending upon the phase (zero or pi radians) the direction and magnitude of the combined magnetic fields is either along the line 19 or along the line 23 (FIGS. 3*c* and 3*d*). Since the magnitude of the combined fields exceeds the switching threshold of the magnetic thin film 18, i.e., crosses the critical curve, the direction of remanent magnetization along the easy axis (H*e*) is determined by which side of the hard axis (H*h*) the resultant field lies as illustrated by lines 19 and 23 (FIGS. 3*c* and 3*d*).

Figure 4A:
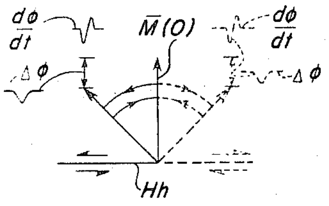
Figure 4B:
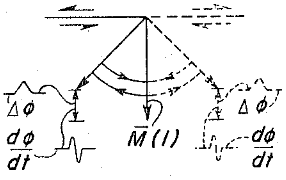

In the previous discussion, the explanation was concluded by describing the storing of binary digits "0" and "1" by writing at a digit position of the memory which writing is capable of changing the direction of magnetization along the easy axis (H*e*) by switching the state of magnetization to $\overline{M}(0)$ or $\overline{M}(1)$. In the present magnetic memory, it is desired to provide for a read operating cycle which includes a read-unipolar pulse train R*u* producing a single applied (pulsed) transverse magnetic field along axis (H*h*) of such magnitude that it may project into the "creeping" zone 13 (FIG. 3*b*) of the magnetic thin film 18 but does not produce switching, and is still able to provide a nondestructive readout operation. It should be clear that the present invention is not limited to this mode of operation, i.e., partially destructive readout manner, even though the present magnetic memory provides for a write (restore) operation after the read operation in each read operating cycle. The present magnetic memory is capable of operating in a completely nondestructive readout manner (no "creeping") where the read-unipolar pulse train R*u* is limited in amplitude so that the pulsed transverse magnetic field produced thereby does not enter into the "creeping" zone 13 of the magnetic thin film 18 to disturb the magnetization state $\overline{M}(0)$ or $\overline{M}(1)$ and writing back is completely unnecessary to maintain the binary magnetization state $\overline{M}(0)$ or $\overline{M}(1)$ (FIGS. 4*a* and 4*b*). Preferably, however, the present invention, as shown, provides for operating in a partially destructive readout manner wherein the read-unipolar pulse train R*u* produces an applied transverse magnetic field which can extend into the "creeping" zone 13 of the magnetic thin film 18 of the rod 12*a* and each read operating cycle includes both a read operation and a write (restore) operation wherein the write (restore) operation provides for maintaining the desired magnitude of magnetization $\overline{M}(0)$ or $\overline{M}(1)$ after each read operation in order to tolerate or provide for "creeping" of the magnetization $\overline{M}$ as a result of an applied transverse magnetic field extending into the "creeping" zone during the read operation.

During any write operation, the magnitude of combined unidirectional and alternating magnetic fields produced by a write-unipolar pulse train W*u* and write A.C. digit current W*a*1 is such as to extend beyond the critical curve for switching by domain rotation. These combined magnetic fields during a write (restore) operation in a read operating cycle will maintain or restore, if necessary, the magnetization M(0) or M(1) if the magnitude of the magnetization has changed as a result of "creeping" while reading.

Summarizing the foregoing, a read operating cycle includes the sensing of the state of the thin magnetic film 18 at digit positions which comprise portions of the cylindrical magnetic thin film 18, e.g., the state of the film 18 at the digit position in the area of solenoid winding 14*a* by applying read-unipolar pulse train R*u* to the solenoid winding 14*a* to produce a unidirectional magnetic field of short time duration along the hard axis (H*h*) which axis (H*h*)is transverse to the easy axis of magnetization. The transverse magnetic field produced by the read pulse train R*u* is substantially the same as the transverse magnetic field produced by the write-unipolar pulse train W*u*, except for a time delay producing a phase shift of 90° (at the ten megacycle frequency (*f*). The reason for the phase shift of the read pulses is to compensate for the phase shift produced in inducing sense signal S*t*1 in the rod conductor 16, for example, at any digit position being read out. Accordingly, the sense signals of train S*t*1 will be properly phased, by compensation, to control the phase of parametric oscillations to store a "1" binary digit in the flip-flop M1, for example.

Referring to FIGS. 4*a* and 4*b*, for a description of the production of typical sense signal trains S*t*1(1) and S*t*2(0) (FIGS. 8*g* and 8*h*), for example, which are produced in response to a read-unipolar pulse train R*u*, a unidirectional transverse magnetic field (H*h*) is produced by each pulse of the read-unipolar pulse train R*u*. As a result, the magnetization $\overline{M}(0)$ or $\overline{M}(1)$ is shifted by each of these pulses as shown in FIGS. 4*a* and 4*b* to produce a change in magnetic flux ($\Delta\phi$) and a rate of change of flux $d\phi/dt$ which is detected by the rod conductor 16 to produce the sense signal train S*t*2(0) or S*t*1(1), for example, as shown in FIGS. 8*h* and 8*g*, respectively. Each unipolar pulse of the train R*u* produces a change in flux ($\Delta\phi$) but the magnetization state $\overline{M}(0)$ or the magnetization state $\overline{M}(1)$ returns to the easy axis after each unipolar pulse of the train R*u*. Thus, the sense signal train S*t*1(1) (FIG. 8*g*) is produced in response to the read-unipolar pulse train R*u* when a binary digit "1" is stored in the digit position being read out. This signal train S*t*1(1) has a predominant ten megacycle component and a phase of pi radians which is fed to the power parametric element M*b*1 (FIG. 6) that is operative to sense the signal S*t*1(1) to control the phase of parametric oscillations therein to be pi radians. The parametric element M*b*1 operates in this manner to detect and utilize the sense signal train S*t*1(1) during the read operation. At least a plurality of sense signals are required in each sense signal train S*t*2(0) or S*t*1(1) since the power parametric element M*b*1 builds up to the desired amplitude level (stable) only after a sufficient number of sense signals are produced to lock the parametric element M*b*1 in oscillation in the phase of pi radians for the digit "1" and the phase of zero radian for a digit "0" as shown in FIG. 8*i*, for example. The dashed lines in FIGS. 4*a* and 4*b* indicate that alternate directions of rotation of $\overline{M}(0)$ or $\overline{M}(1)$ will occur depending upon the direction of the transverse magnetic field. As illustrated, the direction of the transverse magnetic field along the hard axis ((H*h*) is immaterial. This description of FIGS. 4*a* and 4*b* is applicable also to the single frequency circuit operation which is illustrated by corresponding signal trains S*t*1′(1) and S*t*2′(0) in FIGS. 14*g* and 14*h* which are produced in response to read-unipolar pulse trains R*u*′ as disclosed later in the description of operation of the single frequency circuit arrangement.

In general, it is desirable for operating the magnetic memory in a nondestructive readout manner to limit the magnitude of the transverse magnetic field below the threshold for "creeping." However, the complex nature of the "creeping" process is such that some "creeping" may occur after a sufficient number of read-unipolar pulses in the train R*u* are applied, e.g., between three and twenty pulses to produce a sense signal train (e.g., S*t*1(1)) to control the power parametric element M*b*1 (FIG. 6) to produce parametric oscillations in the power phase of pi radians, for example. Furthermore, the cylindrical thin magnetic film having a circumferential easy axis (H*e*) has a number of important advantages over a cylindrical thin film having a longitudinal easy axis (H*e*) (not shown) in that the magnetization states $\overline{M}(0)$ or $\overline{M}(1)$ are retained inherently because of the closed circumferential magnetic path whereby stray de-magnetizing fields do not tend to change the state of magnetization as is often the effect if the easy axis (H*e*) of magnetization is longitudinal. Also, the cylindrical magnetic thin film 18 having the circumferential easy axis (H*e*) has a closed magnetic circuit in this direction which provides a number of important advantages over a thin magnetic thin film produced on flat plates. One advantage is that the cylindrical thin film is unaffected by stray magnetic fields such as the earth's magnetic field. Furthermore, the cylindrical thin film, because of its closed magnetic circuit, has much wider tolerances for thickness and length than a flat or planar magnetic thin film. Also, it has been shown that the signal output is independent of the diameter of the cylindrical thin film 18 and depends only upon the cross-sectional area and length of the magnetic film 18. Thus, the diameter of the rod 12*a* may be reduced to dimensions comparable with the thickness of the film 18 itself.

As to the unidirectional magnetic field in the transverse direction (along the hard axis (H*h*)) that is produced by the read and write-unipolar pulse trains R*u* and W*u*, this feature of the present invention has considerable and important advtanges over using alternating current for reading and writing. Referring to FIGS. 3*c* and 3*d* directed to the dual frequency circuit arrangement of the magnetic memory of the present invention, the abstract diagrams shown therein demonstrate that the unidirectional transverse magnetic field represented by vector 21 in either FIG. 3*c* or 3*d* and produced by any one of the pulses in the train W*u* (FIG. 8*k*) does not cause the locus of points of the combined magnetic field (represented by the heavy lines) to cross over the critical curve except where lines 19 and 23 cross to produce the desired switching of magnetic state to store the binary digits "1" or "0" during writing. The pulses in the pulse train W*u* (FIG. 8*k*) are shaped (made narrow) and timed so that the applied magnetic fields represented by each of the heavy lines shown in FIGS. 3*c* and 3*d* (tracing the change in magnitudes of the combined magnetic fields) have only one crossing point on the respective one of the critical curves. Thus, the magnetization state $\overline{M}(0)$ or $\overline{M}(1)$ will not be repeatedly reversed during a write operation as may be the case if two alternating fields are utilized instead of a combination of a unipolar field and an A.C. field during a write operation. Another advantage of read and write unipolar pulses in trains R*u* and W*u* is that only one isolation diode 17 (FIG. 1) is required for each word in a simple linear selection circuit arrangement. Another important feature is demonstrated by the operation as illustrated in FIGS. 3*c* and 3*d*. As is clear from these diagrams, the crossing of the critical curve by the heavy lines 19 and 23 is precise and switching is instantaneous. Switching of the magnetization state of the thin film 18 at any selected digit position is accomplished by the first write pulse in the write train W*u* (FIG. 8*k*) and "creeping" to provide switching of the magnetization state is not required. This is important because "creeping" to provide switching of the magnetization state is slow and the slow speed is a serious limitation in fast access memory arrangements.

*Read/write signal source 20 (FIG. 5)*

Figure 5:
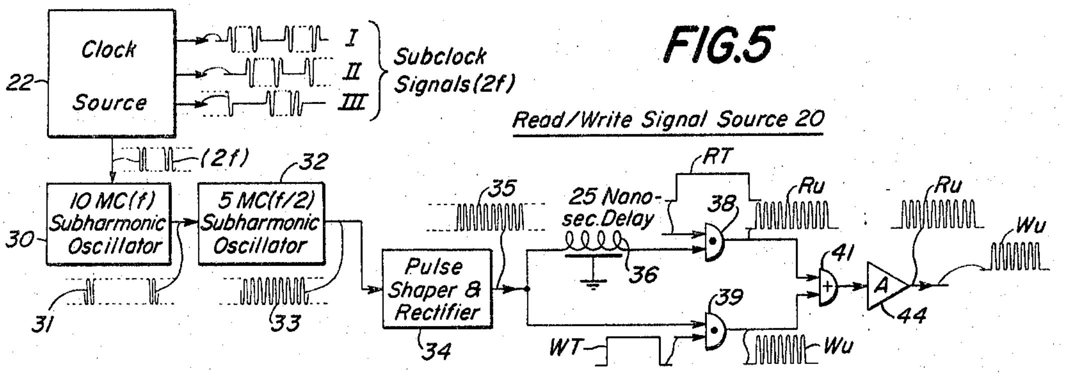
FIG. 5 is a schematic diagram of the read and write signal source and clock source shown in FIG. 1 which illustrates the manner in which the read and write signals are derived according to the dual frequency circuit arrangement of the present invention.

The read/write signal source 20 is provided for dual frequency operation of the magnetic memory (FIG. 1) to supply a read-unipolar pulse train R*u* and a write-unipolar pulse train W*u* (FIG. 10*b*) during each read operating cycle of the memory for readout and restoring the digits of any addressed word in the memory. For a write operating cycle of the memory, the source 20 supplies only a write-unipolar pulse train W*u* during a portion of the time period of subclock II of the memory operating cycle. As shown in FIG. 5, the read and write-unipolar pulse trains R*u* and W*u* are derived from a five megacycle A.C. signal 33, output of subharmonic oscillator 32, shaping and rectifying the five megacycle signal 33 to provide narrow unipolar pulses 35, and separately gating the shaped and rectified pulses by read-timing pulses RT and write-timing pulses WT. The five megacycle A.C. signal 33 supplied by the 5 mc. ($f/2$) subharmonic oscillator 32 is a subharmonic of the twenty megacycle sinusoidal signal ($2f$) generated by the clock source 22 which also supplies the subclock signals ($2f$) I, II and III as shown in FIG. 5. The twenty megacycle signal ($2f$) from the clock source 22 is coupled to the 10 mc. ($f$) subharmonic oscillator 30 to provide a ten megacycle signal ($f$) output which is applied to the 5 mc. ($f/2$) subharmonic oscillator 32. The five megacycle A.C. signal output of the oscillator 32 is coupled to the pulse shaper and rectifier 34 to produce narrow unipolar pulses 35 that are so timed that they will provide the magnetic vectors 21 and lines 19 and 23 shown in FIGS. 3c or 3d during each write operation for writing binary digits "0" or "1" respectively.

The unipolar pulses for the read operation are delayed 25 nano-seconds by the delay line 36 so that sense signals St1(1) and St2(0) generated during a read operation (FIGS. 8g and 8h) are in the proper phase relationship whereby the power parametric element Mb1 (FIG. 6) will produce parametric oscillations of the proper phase in response thereto. The time delay of 25 nano-seconds is equivalent to a 90° phase shift at ten megacycles (f) which places the positive half of each sense signal St1(1) (FIG. 8g) in phase to produce parametric oscillation in the phase of pi radians; and the negative half of each sense signal St2(0) (FIG. 8h) in phase to produce parametric osillation in the phase of zero radian. The delayed unipolar pulses are gated by the read-timing pulse RT in an AND gate 38 to produce read-unipolar pulse train Ru in each read operating cycle wherein the timing is illustrated by the waveforms in FIGS. 8d and 8e. Also, during each read operating cycle, unipolar pulses are gated by the write-timing pulse WT and passed by AND gate 39 to produce the pulse train Wu as illustrated by the waveforms in FIGS. 8j and 8k. The read and write timing pulses RT and WT are supplied, for example, by "one-shot" multivibrators (not shown) triggered by differentiated leading and trailing edges of the clock pulse C (FIG. 8a), for example, in a conventional manner wherein the time duration of each of the timing pulses RT and WT is controllable as desired. Both the read and write timing pulse trains Ru and Wu are applied to the inputs of OR gate 41 having an output which is coupled to the amplifier 44. In accordance with the prior description of FIG. 1, the amplifier 44, if desired, has a transformer output (not shown) to provide a return from the emitter of the row transistors 29, and a "floating" voltage level for read and write-unipolar pulse trains Ru and Wu.

Figure 9:
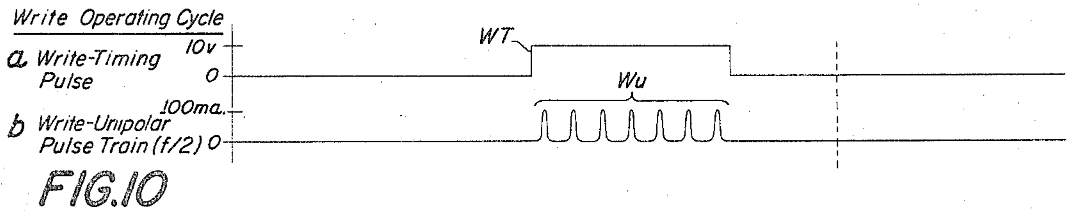
FIG. 9 is a diagram showing selected typical signal waveforms produced by the memory of FIG. 1 including typical waveforms of write-unipolar pulse trains produced by the dual frequency circuit arrangement during a write operating cycle.

The foregoing completes the description of the read/write signal source 20 (FIG. 5) for a read operating cycle. A write operating cycle is similar to a read operating cycle without a read operation. Accordingly, during a write operating cycle, only the write-timing pulse WT is applied to AND gate 39 simultaneously with the write A.C. digit current Wa1 and no read-timing pulse RT is applied to AND gate 38. Typical timing and waveforms for a write operating cycle are shown in FIGS. 9a and 9b. By comparison of FIGS. 8j and 8k and FIGS. 9a and 9b, it is evident that the write operation, in a write operating cycle is the same as the write (restore) operation in a read operating cycle:

*Typical parametric flip-flop M1 (FIG. 6)*

Figure 6:
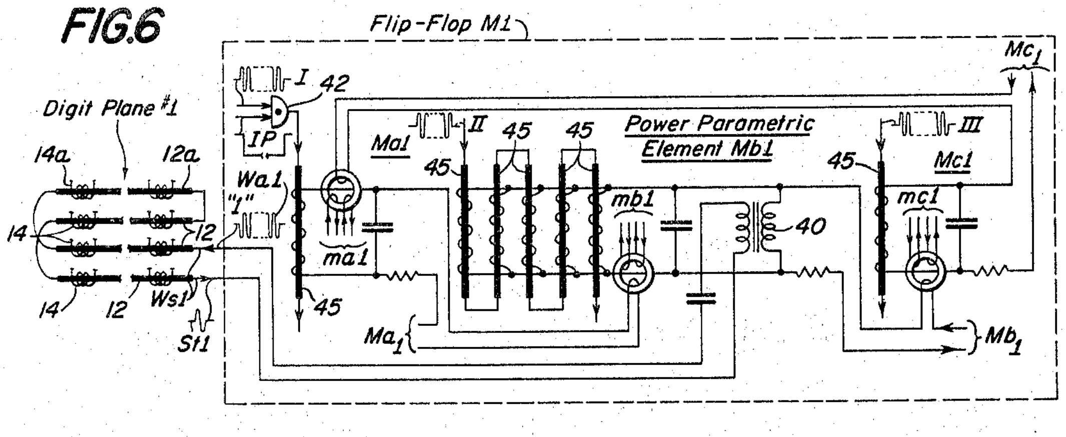
FIG. 6 is a circuit diagram of a typical flip-flop M1 of the memory input-output M Register shown in FIG. 1, according to the present invention.

The details of a typical flip-flop M1 of the M Register (FIG. 1) are shown in FIG. 6 along with the memory digit plane #1 including four magnetic rods 12 and 12a and solenoid windings 14 and 14a. The digit plane #1 is connected to the flip-flop M1 at the sense-input, write-output WS1 to receive the sense signal train St1 for setting the flip-flop M1 in accordance with the binary signals ("1" or "0") read out of an addressed digit position of the memory digit plane #1, and to supply write A.C. digit current Wa1 to write the binary signals ("1" or "0") stored in the flip-flop M1.

The parametric flip-flop M1 comprises three parametric elements Ma1, Mb1 and Mc1. Each of these parametric elements operates in a conventional manner and the parametric flip-flop M1 operates in a conventional manner as disclosed in the cited copending application (Ser. No. 43,801). The inputs for the parametric elements Ma1, Mb1 and Mc1 are ma1, mb1 and mc1, respectively, and the outputs for parametric elements Ma1, Mb1 and Mc1 are $Ma_1$, $Mb_1$, and $Mc_1$, respectively. Other flip-flops M2 to M4 have corresponding designations for inputs and outputs. In addition, the sense input and write output WS1 is provided for the power parametric element Mb1, and as shown in FIG. 6, pulse transformer 40 is included to provide efficient coupling of the power parametric element Mb1 to the magnetic rods 12 of the memory digit plane #1. Because of the efficiency of this pulse transformer 40, it has been found that the sense signal train St1 will control the phase of parametric oscillation of the power parametric element Mb1 even if another control "seed" signal is applied to the input mb1. However, to avoid the possibility of control signals being applied to input mb1 from parametric element Ma1, the subclock I is not passed by AND gate 42 to the magnetic rod 45 of the parametric element Ma1 during a read operating cycle. Accordingly, an inhibit pulse IP (FIG. 8f) is produced each read operating cycle to inhibit parametric oscillation therein and also to inhibit transfer of binary digits from parametric element Ma1 to power parametric element Mb1.

The power parametric element is similar to other parametric elements using only a single magnetic rod 45 and the additional magnetic rods 45 serve only to provide the additional power required to supply the write A.C. digit current (200 ma. for example) to the memory digit plane #1.

In FIG. 6, the details shown therein disclose an important advantage of the magnetic memory of the present invention. It should be noted that the group of magnetic rods 12 in any one of the digit planes #1–#4 is connected in a closed loop to a transformer 40. Further, the easy axis of remanent magnetization of the respective magnetic rods 12 are circumferential. Thus, the applied magnetic fields produced by the write digit current in the magnetic rod conductors, are produced in opposite directions along the circumferential easy axis of the magnetic thin film to store respective binary digits "1" or "0." The sense signal train St1 produced in the rod conductors during readout are produced in the closed loop formed by the group of magnetic rods 12 of any digit plane. This circuit arrangement of the memory provides for simplification of the memory array matrix including a common sense signal and write current closed loop line for each digit plane of the memory, and also, a common sense signal and write current circuit for each digit plane of the memory for sensing the sense signal outputs of the memory and producing the write currents for writing into the memory.

*Typical address decoding circuit (FIG. 7)*

In the description of the magnetic memory of FIG. 1, it was noted that diode logic was preferred to parametric logic in the column and row address decoding matrices 24 and 26. Since the L Address Registers flip-flops L1 to L4 are preferably parmetric flip-flops, the outputs of these flip-flops have been converted from phase signals of zero or pi radians to suitable high "0" and low "1" level signals $Ld_1$ to $Ld_4$ by phase to D.C. converters as illustrated by the typical phase to D.C. converter 50 in FIG. 7 for the flip-flop L1. Flip-flop L1 includes a parametrical element La1 (not shown) having an output $La_1$ (FIG. 7) which is coupled to one of the inputs of the phase to D.C. converter 50. The other input $Pk_1$ (1) shown is the output of a constant parametric element (not shown) which always supplies a signal (f) of the phase pi radians in a known manner. Both signals $La_1$ and $Pk_1$ are coupled to the respective input windings of the toroidal core 52 having an output winding coupled between the base and emitter of NPN transistor 54. Because of the inherent circuit capacity between the base and emitter of transsistor 54, no A.C. bypass capacitor is required and the D.C. output of transistor 54 is coupled via the emitter to the base of NPN transistor 56. The inverted D.C. signal current output from the collector, of transistor 56, is coupled to respective inputs of diode AND gates of the logical network as shown. The false output $Ld_1'$ is coupled directly to the diode network along with a similar false output $Ld_2'$ of the flip-flop L2 for the (column) word line –0–. The collector output of transistor 56 is coupled to the base of NPN transistor 58 where it is inverted to provide the true output $Ld_1$ of flip-flop L1 for the diode decoding network for selecting (column) word line –1– as shown.

The outputs of each diode decoding networks of the column and row decoding matrices 24 and 26 (FIG. 1) are coupled to pulse forming circuits to provide decoder output gating signals, e.g., G*s*, shown in FIGS. 6 and 10*a*. As shown in FIGS. 10*a* and 10*b*, the timing of the gating signal G*s* permits the passing of read-unipolar pulse train R*u* and write-unipolar pulse train W*u* to the selected column word line –0–, for example, which is connected to the emitter of transistor 28*a*. A similar gating G*s* is suppled from the row decoding matrix to the selected row word line –0–, for example, which is connected to the collector of transistor 29*a*. According to the example illustrated in FIG. 6, the read and write-unipolar pulse trans R*u* and W*u* are passed through the solenoid windings 14*a* to 14*d* at the word position 0–0 of the word plane #1 to read out and destore the binary digits in word position 0–0 in a single memory read operating cycle. The gating signal G*s* is also produced during a memory write operating cycle to pass the write-unipolar pulse train W*u* to write the binary digits, stored in flip-flops M1 to M4, into the selected word position 0–0.

Figure 7:
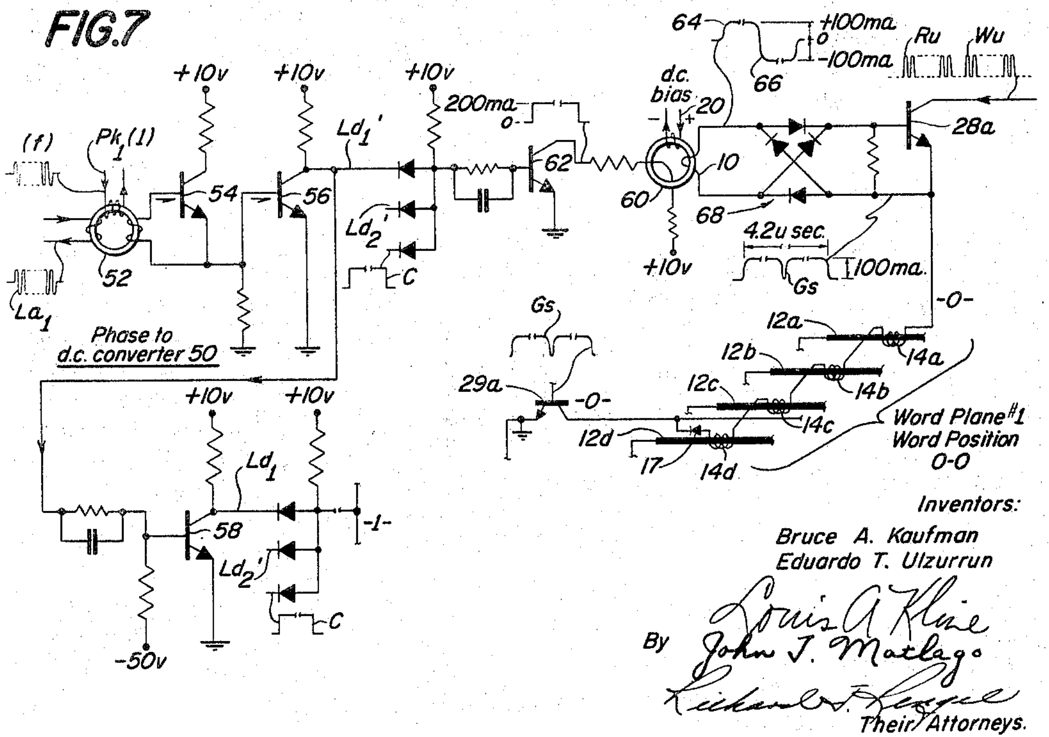
FIG. 7 is a circuit diagram showing the phase to D.C. converter output circuit of a typical memory address register flip-flop and a portion of the circuitry of the column decoding matrix and a word storage portion of the memory array shown in FIG. 1.

As shown in FIG. 7, the pulse forming circuit for providing the gating signal G*s* comprises a ferrite switch core 60 having an input winding connected to the collector of an NPN transistor 62, a D.C. bias winding and an output winding. The pulse output on the collector of transistor 62 saturates the switch core 60 to produce a positive pulse 64 on the output winding and D.C. bias current returns the core 60 to its initial state to produce a negative pulse 66. The positive and negative pulses produced on the output winding of switch core 60 are passed by a full wave rectifier circuit 68 to produce the gating signal G*s* which is applied across the base-emitter circuit of transistor 28*a* to pass the read and/or write-unipolar pulse trains R*u* and W*u* which are applied to the collector of transistor 28*a* from the read/write signal source 20.

*Single frequency circuit arrangement*

Figure 11:
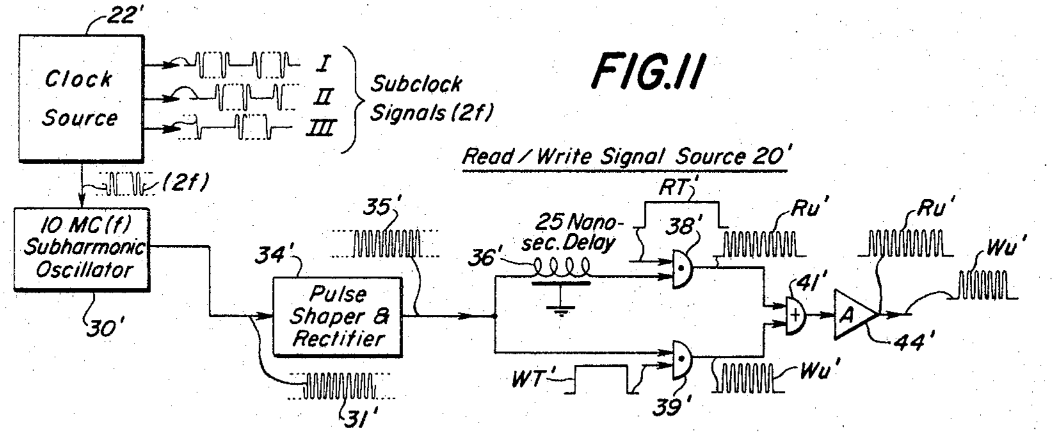
FIG. 11 is a schematic diagram of the read and write signal source and clock source shown in FIG. 1 which illustrates the manner in which the read and write signals are derived according to the single frequency circuit arrangement of the magnetic memory of the present invention.

In the foregoing description, the magnetic rod memory of the present invention is described in connection with FIG. 1 and FIGS. 6 and 7; and also FIGS. 2*a*, 2*b*, 2*c* and FIGS. 3*a*, 3*b*, 4*a* and 4*b*. The separate dual frequency circuit arrangement was disclosed by description of FIG. 5 showing the read/write signal source 20 which provides a source of five megacycle (5 mc.) read and write-unipolar pulse trains W*u* and R*u* for the magnetic memory arrangement of FIG. 1. The operation of the dual frequency circuit arrangement is further illustrated by abstract diagrams of FIGS. 3*c* and 3*d* and typical waveforms shown in FIGS. 8 to 10. The description which follows is directed to the single frequency circuit arrangement of the present magnetic memory and will be described in connection with FIGS. 11 which is directed to the read/write signal 20' that supplies ten megacycle (10 mc.) read and write-unipolar pulse trains W*u'* and R*u'* for the magnetic memory of FIG. 1. The operation of the single frequency circuit arrangement is further illustrated by abstract diagrams of FIGS. 12*a* and 12*b* for showing the magnetic fields for rotational switching in the process of writing a "0" binary digit and a "1" binary digit, respectively. Typical waveforms of signals produced during the operation of the single frequency circuit arrangement are shown in FIGS. 13 to 16. It should be noted that the operation of the dual frequency circuit arrangement and the operation of the single frequency circuit arrangement of the magnetic memory of FIG. 1 are similar and differences in operation result from the use of different read/write signal sources 20 and 20' shown in FIGS. 5 and 11, respectively. Accordingly, the previous general and detailed descriptions of FIG. 1 and FIGS. 6 and 7 and also FIGS. 2*a*, 2*b*, 2*c*, 3*a*, 3*b*, 4*a* and 4*b* remain the same for the single frequency circuit arrangement wherein corresponding reference characters have been primed to clearly distinguish those circuits provided for the single frequency circuit arrangement as shown in FIG. 11; and also to clearly distinguish the abstract diagrams of FIGS. 12*a* and 12*b*, and waveforms shown in FIGS. 13 to 16 (except clock C. subclocks I, II, III and pulse IP). Thus, the description of FIGS. 1, 6, 7 and the others which remain the same will not be repeated in detail here, and the description of single frequency circuit arrangement which follows will be limited primarily to a description of the read/write signal source 20' of FIG. 11, diagrams of FIGS. 12*a*, 12*b* and waveforms of FIGS. 13 to 16 which distinguish the operation of the single frequency circuit arrangement from the previously described dual frequency circuit arrangement of the memory of the present invention. However, before going into detailed description of the single frequency circuit arrangement, some addition general description of the operation of the magnetic memory of FIG. 1 as it relates to the single frequency circuit arrangement will be set forth to provide a better understanding of some of the more important features of the present invention.

In accordance with the general and detailed description of the thin film magnetic memory of FIG. 1, the single frequency circuit arrangement provides unipolar pulses from the source 20' for reading data from the memory (and restoring data back into the memory) and writing into the memory. During a read (and restore) operating cycle, a read-unipolar pulse train R*u'* (FIG. 14*e*) is applied to any selected word line including a group of four solenoids 14 at any one word position (e.g., solenoids 14*a* to 14*b* at addressed word position 0–0) to produce signal trains S*t*1', S*t*2' (FIGS. 14*g* and 14*h*) and S*t*3' and S*t*4' (corresponding to S*t*3 and S*t*4 shown in FIG. 1) and immediately after a write-unipolar pulse train W*u'* (FIG. 14*k*) is applied to same word line and group of four solenoids and in the same read operating cycle to restore the data to the addressed word position. This important feature remains in common in the separate dual frequency circuit arrangement and single frequency circuit arrangement; i.e., the magnetic field (along axis H*h*) is generated by the read and write-unipolar pulse trains R*u* (R*u'*) and W*u* (W*u'*).

Further, the single frequency circuit arrangement retains the advantages of the magnetic memory of the present invention when writing-back (restore) data into the memory, or in writing in new data, wherein a magnetic field is produced in the transverse direction (along axis H*h*) only during the half cycle of the A.C. digit current W*a*1 (W*a*1'), W*a*2 (W*a*2'), etc. (FIGS. 8*j* and 14*j*) when it is desired to produce magnetic switching of the magnetic thin film at the four separate digit positions of the selected word position to stor binary digits "1" and "0." Accordingly, only when the write A.C. digit current W*a*1 (W*a*1'), W*a*2 (W*a*2'), etc. (zero or pi radius for binary digits "0" or "1," respectively) is of the proper polarity is the write-unipolar pulse present to produce a combined magnetic field which will cross the switching threshold of the magnetic thin film at the selected digit positions to restore (during a read operating cycle) or write (during a write operating cycle). Consequently, "creep" phenomena is not required for writing and much faster writing occurs since magnetic (rotational) switching occurs in response to a single write-unipolar pulse of the write-unipolar pulse train. Also, the single frequency circuit arrangement retains the advantage of the use of read and write-unipolar pulses in that the word selection circuits of the memory matrix require only a single isolation diode 17 for each word position.

The read/write signal source 20' provides the read-unipolar pulse train R*u'* and write-unipolar pulse train Wu' for the magnetic memory shown in FIG. 1 and these pulse trains Ru' and Wu' correspond to read and write pulse trains Ru and Wu, respectively. In FIG. 1, the read/write signal source is designated by the corresponding reference number 20. The read/write signal source 20', as shown in FIG. 11, supplies read-unipolar pulse trains Ru' and write-unipolar pulse trains Wu' having a pulse repetition rate of ten megacycles (10 mc.) which pulse repetition rate corresponds to the ten megacycles (10 mc.) frequency (*f*) of parametric oscillations, e.g., the write A.C. digit current Wa1'. Since the pulse repetition rate of the unipolar pulses Ru' and Wu' and the frequency (*f*) of the parametric oscillations is the same, e.g., ten megacycles (10 mc.), this is designated the single frequency circuit arrangement of the magnetic memory and distinguishes from the dual frequency circuit arrangement of the magnetic memory of the present invention. Accordingly, the most easily recognizable difference in the circuits of the separate dual and single circuit arrangements can be noted in comparison of the read/write signal sources 20 and 20', FIGS. 5 and 11, respectively. As the description of the operation of the single frequency circuit arrangement proceeds, significant improvements in the operation of the magnetic memory over dual frequency mode of operation will be noted. Referring briefly to FIG. 5 for noting this operation of the read/write signal source 20 which provides the read and write-unipolar pulses Ru and Wu for the dual frequency circuit arrangement; the read/write signal source 20 includes the 5 mc. (*f*/2) subharmonic oscillator 32 which provides the five megacycles (5 mc.) A.C. output signal 33 in response to a ten megacycle (10 mc.) A.C. input signal supplied by the 10 mc. (*f*) subharmonic oscillator 30. This five megacycle (5 mc.) A.C. output signal 33 of oscillator 32 is shaped and rectified to provide five megacycle (5 mc.) read-unipolar pulses 35 and five megacycle (5 mc.) write-unipolar pulse trains Ru and Wu to the output of amplifier 44. In contrast to the foregoing, in FIG. 11, the read and write-unipolar pulse trains Ru' and Wu' are supplied at a ten megacycle (10 mc.) rate. Thus, the ten megacycle (10 mc.) output signal of the 10 mc. (*f*) subharmonic oscillator 30' is coupled directly to the pulse shaper and rectifier 34' to provide ten megacycle (10 mc.) unipolar pulses 35' and read and write-unipolar trains Ru' and Wu' at the ten megacycle (10 mc.) rate at the output of amplifier 44'.

Referring to FIG. 11 for a more detailed description thereof during the operation of the memory (FIG. 1) for a read (restore) operating cycle, the read/write signal source 20' supplies read and write-unipolar pulse trains Ru' and Wu' (as shown more clearly by the waveforms in FIG. 16*b*) for readout and restoring the digits at any addressed word position in the memory. For a write operating cycle of the memory (FIG. 1), the source 20' supplies only the write-unipolar pulse train Wu', as more clearly shown by the waveforms in FIG. 15*b*, to write a new word in any selected word position in the memory. During either read (restore) operating cycles or write operating cycles, therefore, the read/write signal source 20' supplies either read and write-unipolar pulse trains or only write-unipolar pulse trains in accordance with the previous description of the operation of the memory shown in FIG. 1. As shown in FIG. 11, the read and write-unipolar pulse trains Ru' and Wu' are derived from a ten megacycle (10 mc.) A.C. signal 31', output of subharmonic oscillator 30', shaping and rectifying the ten megacycle signal 31' to provide narrow unipolar pulses 35' at the ten megacycle rate, and separately gating the shaped and rectified pulses by read-timing pulses RT' and write-timing pulses WT'. The ten megacycle A.C. signal 31' supplied by the 10 mc. (*f*) subharmonic oscillator 30' is the first subharmonic of the twenty megacycle sinusoidal signal (2*f*) generated by the clock source 22' which also supplies the subclock signals (2*f*) I, II and III, as shown in FIG. 11. The narrow unipolar pulses 35' at the output of the pulse shaper and rectifier 34' are so timed that they will provide the magnetic vectors 21' representing the transverse magnetic fields produced along the hard axis H*h*. The combined magnetic fields produced by each of the write-unipolar pulses of the train Wu' and the write A.C. digit current (e.g., Wa1', FIG. 13*b*) trace lines 19' and 23' shown in FIGS. 12*a* and 12*b* during each write or restore operation for writing or restoring binary digits "0" or "1," respectively into the addressed digit positions of the memory.

As shown in FIG. 11, the unipolar pulses, passed by an AND (signal transmission) gate 38' for the read operation, are delayed 25 nano-seconds by the delay line 36' so that sense signals (FIG. 13*d*) of the trains St1'(1) and St2'(0) are produced in response to read-unipolar pulses (FIG. 13*c*) of the train Ru' and generated during a read operation are in the proper phase relationship whereby the power parametric element Mb1 (FIG. 6) will produce parametric oscillations of the proper phase in response to said sense signals of the trains St1'(1) and St2'(0). The time delay of 25 nanoseconds is equivalent to a 90° phase shift at the ten megacycle signal frequency (*f*) which places the positive half of each sense signal (FIG. 13*d*) of the train St1'(1) in the proper phase to produce parametric oscillation in the phase of pi radians (e.g., Wa1' as shown in FIG. 13*b*); and the negative half of each sense signal of the train St2'(0) in the proper phase to produce parametric oscillation in the phase of zero radians (e.g., Wa2' as shown in FIG. 13*b*). The delayed unipolar pulses are gated by the read-timing pulse RT' in the AND gate 38' to produce read-unipolar pulse train Ru' in each read operating cycle. FIG. 13*c* more clearly illustrates the delay of unipolar pulses 33' to provide delayed pulses Ru'. As shown in FIG. 13*d* the sense signals of trains St1'(1) and St2'(0) are of the proper phase relationship to produce parametric oscillations (write A.C. digit currents Wa1' and Wa2', respectively), for power parametric elements in the flip-flops M1 and M2 (FIG. 1), respectively. It should be noted that the proper phase of the sense signals is demonstrated in FIG. 13*d* by the fact that zero-crossing points 70 of the sense signals occur at the same time as zero-crossing points 71 of the parametric oscillations as shown in FIG. 13*b*. Thus, the sense signals of the trains St1'(1) and St2'(0), produced by the ten megacycle (10 mc.) read-unipolar pulses Ru', are in the proper phase to set up parametrical oscillations at pi and zero radians in the flip-flops M1 and M2, respectively. In FIG. 13*e*, the fundamental components of the sense signals of trains St1'(1) and St2'(0) are shown to more clearly demonstrate the manner in which the parametrical oscillations (e.g., Wa1', Wa2' shown in FIG. 13*b*) are set up in the power parametric elements of the flip-flops M1 and M2, i.e., it is this fundamental component of the sense signals which provides the signal for control of the parametrical oscillations (pi or zero radians).

Also during each read operating cycle, unipolar pulses are gated by the write-timing pulse WT' and passed by AND gate 39' to produce the pulse train Wu' as illustrated by the waveforms in FIGS. 14*j* and 14*k*. The read and write timing pulses RT' and WT' are supplied, for example, by "one-shot" multivibrators (not shown) triggered by differentiated leading and trailing edges of the clock pulse C (FIG. 14*a*), for example, in a conventional manner wherein the time duration of each of the timing pulses RT' and WT' ("on time" of the one shots) is controlled as shown. Both the read and write timing pulse trains Ru' and Wu' are applied to the inputs of OR gate 41' having an output which is coupled to the amplifier 44'. In accordance with the prior description of FIG. 1, the amplifier 44' (FIG. 11), if desired, has a transformer output (not shown) to provide a return for the emitters of the row transistors 29 (FIG. 1), and a "floating" voltage level for read and write-unipolar pulse trains Ru' and Wu'.

The foregoing completes the description of the read/write signal source 20' (FIG. 11) for a read operating cycle. A write operating cycle is similar to a read (restore) operating cycle without a read operation. Accordingly, during a write operating cycle, only the write-timing pulse WT' is applied to AND gate 39' during the write A.C. digit current W*a*1' and W*a*2' as shown by FIGS. 14*j* and 14*i*, and no read-timing pulse RT' is applied to AND gate 38' in a write operating cycle. Typical timing and waveforms for a write operating cycle are shown in FIGS. 15*a* and 15*b*. By comparison of FIGS. 14*j* and 14*k* and FIGS. 15*a* and 15*b*, it is evident that the write operation, in a write operating cycle is the same as the write (restore) operation in a read operating cycle.

In the foregoing description of the operation of the single frequency circuit arrangement of the magnetic memory of the present invention, it was pointed out that the operation is similar to the dual frequency arrangement and the distinguishing circuits were found in the read/write signal sources 20 (FIG. 5) and 20' (FIG. 11). It was seen that the signal source 20 (FIG. 5) supplied read and write-unipolar pulse trains R*u* and W*u* to the solenoids 14*a* to 14*d*, for example, at a five megacycle (5 mc.) pulse repetition rate. In response to each read-unipolar pulse train R*u*, the magnetic rods 12 of the memory of FIG. 1 produce sense signal trains S*t*1 to S*t*4 and as shown in FIG. 8*g*, the repetition rate of the sense signals in the train S*t*1(1) are at the same five megacycle rate. Further, in response to the write-unipolar pulse train at the five megacycle (5 mc.) rate, the unipolar pulses are concurrent only on alternate cycles of the ten megacycle write A.C. digit current (e.g., W*a*1). Accordingly, the magnetic memory elements of the memory of FIG. 1 are operating at half of their possible speed of operation for reading and restoring or writing because the read and write-unipolar pulse trains R*u* and W*u* are only effective at any selected word position (group of four solenoids) at the five megacycle (5 mc.) rate instead of a possible ten megacycle (10 mc.) rate. Stated more generally, the magnetic memory of FIG. 1 is made operative by the dual frequency circuit arrangement (FIG. 5) at one-half (e.g., 5 mc.) of its own rate (e.g., 10 mc.). For writing (or restoring) operations, this lower rate (one-half) is made most easily apparent by reference to the diagrams of FIGS. 3*c* and 3*d*. In FIG. 3*c*, for example, it should be noted that it is only on alternate cycles (5 mc.) of the (10 mc.) write A.C. digit current (e.g., W*a*1) that combined magnetic fields are produced along line 19 which crosses the critical curve (asteroid curve) for switching of the magnetic thin film at the digit positions of the memory. This is because the magnetic field (shown by vector 21) is produced by the write-unipolar pulses in a train W*u* at the 5 mc. rate and the A.C. magnetic field along axis H*e* is produced by the write A.C. digit current (e.g., W*a*1) and is a 10 mc. signal. Consequently, the combined magnetic field represented by the line 19 is produced only at the five megacycle (5 mc.) rate. Since switching for writing (or restoring) occurs only by combined magnetic fields along line 19, the speed of operation for writing is limited to the five megacycle (5 mc.) rate.

Considering now the operation of the single frequency circuit arrangement of the magnetic memory of the present invention which is operated by the ten megacycle (10 mc.) read and write-unipolar pulses of the trains R*u*' and W*u*' as provided by the read/write signal source 20' (FIG. 11), it should be noted that the ten megacycle pulse rate is the same as the 10 mc. frequency of the write A.C. digit current (e.g., W*a*1') and ten magacycle (10 mc.) rate of operation of the memory. This operation provides for the most effective utilization of the high frequency of A.C. digit currents (e.g., W*a*1') of the magnetic memory (e.g., 10 mc.) by reading and writing at the same rate (10 mc.). The foregoing basis of operation is demonstrated by the diagrams of FIGS. 12*a* and 12*b*. As shown by the magnetic field vectors in FIGS. 12*a* and 12*b*, the write A.C. digit current (e.g., W*a*1', FIG. 14*i*) produced alternating magnetic fields along the vertical easy axis H*e* and the write-unipolar pulses W*u*' (FIG. 14*k*) produce the transverse magnetic field along the horizontal hard axis H*h*. Since the frequency of the write A.C. digit current (e.g., W*a*1') and the repetition rate of the write-unipolar pulses are the same, combined magnetic fields are produced each cycle of the write A.C. digit current (10 mc.) in the single frequency mode of operation and not just alternate cycles as in the other dual frequency mode of operation. Thus, in the single frequency mode of operation of the magnetic memory of FIG. 1, the combined magnetic fields produced by the write A.C. digit current and the write-unipolar pulses provide for switching each cycle of the A.C. digit current for more frequent writing (or restoring) at the higher rate of operation of the memory.

As to the read operation, the single frequency circuit arrangement provides even greater advantages over the dual frequency circuit arrangement. During reading, twice as many sense signals are produced in each of the trains, e.g., sense signal train S*t*1'(1) is illustrated in FIG. 14*g* to be at the 10 mc. rate. The advantage is that the sense signal trains (e.g. S*t*1'(1)) having a ten megacycle (10 mc.) rate do provide sense signals having a stronger ten megacycle signal component (FIG. 13*e*) for better and faster response in the setting of the flip-flops (e.g., M1) during a read operation. In view of the foregoing, it should be noted that the magnetic memory of FIG. 1 is operated with greater reliability in the single frequency mode of operation when compared to the dual frequency mode of operation. This is an important factor when considering operation of the magnetic memory under conditions in which noise becomes appreciable and other conditions which can effect the operation of the memory. Further, it should be noted that the time period of the operating cycle can be reduced in view of the fact that the read and write-unipolar pulses in the single frequency circuit arrangement are producing stronger sense signals than the sense signals provided by the previously described dual frequency circuit arrangement.

While the foregoing describes the magnetic memory of the present invention as a memory having a storage capacity for sixteen words of four digits in each word (see FIG. 1), it should be realized that in practicing the invention a typical memory array, for example, may comprise twenty-six digit planes for a twenty-six bit word, sixteen magnetic rods 12 (each of which is 4.5 inches in length) for each digit plane, and thirty-two digit positions on each magnetic rod 12. Each word plane of this exemplary array includes thirty-two words, therefore, and the total storage capacity of an exemplary array comprises 512 words. Each of these exemplary memory arrays comprises a module and a memory arrangement comprises a number of modules having the desired storage capacity. Selection of any word in this memory is provided by simultaneous selection of any single module, and any row and any column of the selected module. Also, it should be noted that pulsed digit currents can be used instead of A.C. digit currents. Furthermore, the binary information can be sensed by the polarity of the sense signals rather than the phase of the sense signals, particularly if destructive readout is provided by higher amplitude read signals which destroy the magnetization state at the digit position being read out. For example, the combination of writing according to description of FIG. 1 and detecting the polarity of the first half cycle of each sense signal during readout to produce, for example, a high level pulse for a binary "1" digit and a low level pulse for a binary "0" digit. This type of output requires D.C. to phase conversion before writing back which requires an A.C. digit current whose phase (pi or zero radians) represents binary digits "1" or "0." Another combination evident from the description is the readout by detecting the phase of the sense signal to produce parametric oscillations, phase to D.C. conversion and writing by the combination of D.C. write signal current, in which the polarity of the write current determines the binary digits "1" and "0," and the previously described write-unipolar pulses.

In the light of the above teachings, various modifications and variations of the present invention are contemplated and will be apparent to those skilled in the art without departing from the spirit and scope of the invention.

What is claimed is:

1. A single frequency, thin-film magnetic memory comprising:

a plurality of word storage locations including digit storage positions, said digit storage positions comprising an anisotropic thin-film of ferromagnetic material having a preferred easy axis of magnetic domain orientation and a transverse hard axis;

a digit position circuit means for producing an alternating magnetic field along said easy axis and unidirectional magnetic field along said hard axis; and circuit means coupled to said digit position circuit means for applying write A.C. digit current and unipolar pulses having the same repetition rate and relative timing to said digit position circuit means to produce said alternating and unidirectional magnetic fields concurrently on alternate half cycles of said A.C. digit current, said A.C. digit current being of one phase state or another phase state representing a binary digit "1" or "0," respectively, said digit position circuit means being constructed and arranged whereby said thin-film is responsive to said concurrent magnetic fields during alternate half cycles of the A.C. digit current to produce switching of said thin-film by domain rotation and in a direction along the easy axis corresponding to the direction of the alternating magnetic field during said alternate half cycles to magnetically store a corresponding binary digit "1" or "0."

2. A single frequency, thin-film magnetic memory comprising:

a plurality of individually addressable word storage locations including digit storage positions, said digit storage positions comprising an anisotropic magnetic thin-film having a preferred easy axis of remanent magnetization and a transverse hard axis;

digit position circuit means for producing an alternating magnetic field along said easy axis at the digit positions and unidirectional magnetic field along said hard axis in response to A.C. currents and unipolar pulses, respectively;

input-output circuit means coupled to said digit position circuit means including a common circuit for supplying A.C. digit currents during writing operations for storing data and receiving sense signals during read operations, said A.C. digit currents and sense signals being of one phase state or another opposite phase state representing binary digit "1" or "0," respectively; and read-write circuit means for applying unipolar pulses to said digit position circuit means during read and write operations, said unipolar pulses having the same repetition rate and timing as said A.C. digit currents in order to produce concurrent alternating and unidirectional magnetic fields on alternate half cycles of said A.C. digit currents during write operations and said sense signals during read operations, said digit position circuit means being constructed and arranged whereby said thin-film is responsive to said concurrent magnetic fields during alternate half cycles of said A.C. digit currents to produce switching of said thin-film by domain rotation and in a direction along the easy axis corresponding to the direction of the alternating magnetic field during said alternate half cycles to magnetically store a corresponding binary digit "1" or "0," and said thin-film being responsive to only said transverse magnetic fields produced by only said unipolar pulses during read operations to produce sense signals having one or the other of said phase states representing binary digit "1" or "0."

3. The single frequency, thin-film memory according to claim 2 in which said read-write circuit means produces a series of read-unipolar pulses for a read operation and produces a series of write-unipolar pulses for a write operation during a read operating cycle of the memory for reading and restoring a word of data in an addressed word storage position of the memory.

4. The single frequency, thin-film magnetic memory according to claim 3 in which said input-output circuit means comprises a parametric element having said common circuit for supplying A.C. digit currents during writing operations for storing data, and also receiving sense signals during read operations in order to produce parametric oscillations having a phase state corresponding to the phase state of said sense signals from a single digit storage position.

5. A single frequency, thin-film magnetic memory comprising:

a plurality of individually addressable word storage locations and a group of digit storage positions for each word storage location;

digit storage means for said digit storage positions comprising an anisotropic magnetic thin-film disposed about an electrical conductor and within an electrical winding individual to a digit storage position, said thin-film having a circumferential preferred easy axis of remanent magnetization and a transverse hard axis;

input-output circuit means including circuit means individual to digit positions of the same order for applying A.C. digit currents to said electrical conductor during writing operations for storing digital data in digit positions of the same order in said word storage locations and for receiving sense signals from digit positions of the same order during read operations, said A.C. digit currents and sense signals being of one phase state or another opposite phase state representing binary digit "1" or "0," respectively; and read-write circuit means including selective circuit means for applying unipolar pulses to said windings for any addressed word storage location during both read and write operations, said unipolar pulses having the same repetition rate and timing as said A.C. digit currents in order to produce concurrent alternating and unidirectional magnetic fields on alternate half cycles of said A.C. digit currents during write operations and said sense signals in response to unipolar pulses only during read operations, said digit storage means being constructed and arranged whereby said thin-film at a selected digit storage position is responsive to said concurrent magnetic fields during alternate half cycles of said A.C. digit current to produce switching of said thin-film by domain rotation and in a direction along the easy axis corresponding to the direction of the alternating magnetic field during said alternate half cycles to magnetically store corresponding binary digit "1" or "0" at said digit storage position, and said thin-film at a selected digit storage position being responsive to unidirectional magnetic fields only during read operations to produce sense signals having one or the other of said opposite phase states to represent binary digit "1" or "0."

6. In a single frequency, thin-film magnetic memory, a digit storage position comprising:

an anisotropic thin-film of ferromagnetic material having a preferred easy axis of magnetic domain orientation and a transverse hard axis;

digit position circuit means including a first electrical conductor for producing an alternating magnetic field along said easy axis and a second conductor for producing a unidirectional magnetic field along said hard axis for storing binary digits; and circuit means coupled to said first and second conductors for applying write A.C. digit current to said first conductor and write-unipolar pulses to said second conductor, said A.C. digit current and unipolar pulses having the same repetition rate and relative timing to produce said alternating and unidirectional magnetic fields concurrently at said digit position on alternate half cycles of said A.C. digit current, said A.C. digit current being of one phase state or another phase state representing binary digit "1" or "0," respectively, said digit position circuit means being constructed and arranged whereby said thin-film is responsive to said concurrent magnetic fields during alternate half cycles of the A.C. digit current to produce switching of said thin-film by domain rotation and in a direction along the easy axis corresponding to the direction of the alternating magnetic field during said alternate half cycles to magnetically store the corresponding binary digit "1," or "0."

7. A single frequency, thin-film magnetic memory arrangement including individually addressable word storage locations comprising:

an array of magnetic rods, each of said magnetic rods comprising a rod conductor having a circumferential anisotropic magnetic thin-film thereon;

a plurality of groups of serially connected solenoid windings for corresponding plurality of word storage locations, said windings of at least one of said groups being wound on respective ones of a corresponding group of said magnetic rods to provide digit storage positions on said magnetic rods at said word storage locations;

a source of unipolar pulses having a predetermined repetition rate for producing a series of said pulses each operating cycle of the memory and for providing at least one write-unipolar pulse;

selection means for selectively applying said write-unipolar pulse to any group of said solenoid windings for applying a transverse unidirectional magnetic field to the magnetic thin-film at respective digit positions of a word storage location in response to said write-unipolar pulse; and input-output data storage means including a plurality of circuit means coupled to the rod conductors of said group of magnetic rods for applying a separate A.C. digit current to each digit position of a word location wherein said A.C. digit currents have the same repetition rate as said unipolar pulses so as to provide concurrent signals on alternate half cycles of said A.C. current, said A.C. digit currents having one phase state or another phase state to represent digital data, said group of magnetic rods at the digit storage positions of any selected word location being responsive to respective ones of said A.C. digit currents to apply a circumferential A.C. magnetic field to the magnetic thin-film of the magnetic rods at said word storage location whereby said magnetic thin-film at the selected word location is responsive to coincidence of said unidirectional magnetic field and said A.C. magnetic field of one phase state or the other phase state to provide for switching of the magnetic thin-film at respective digit positions of the word location to store a word of said digital data.

8. The single frequency, thin-film magnetic memory arrangement according to claim 7 in which at least a portion of said series of unipolar pulses are delayed to provide a read-unipolar pulse train and said selection means applies only said read pulse train to any single group of said solenoid windings comprising a word location to apply a corresponding train of transverse unidirectional magnetic fields to the magnetic thin-film at the digit storage positions of the selected word storage location, said magnetic thin-film at said digit storage positions being responsive to said train of transverse magnetic fields produced by said delayed read pulses to induce sense signals in respective rod conductors at said digit positions, said sense signals having a fundamental component which is of one phase state or another phase state for representing digital data in said input-output storage means.

9. The single frequency, thin-film magnetic memory arrangement according to claim 8 in which said A.C. current comprises parametric oscillations and said input-output data storage means comprises a group of parametric elements for producing parametric oscillations of said one phase state or said other phase state.

10. A magnetic thin-film memory comprising:

a plurality of magnetic rods connected in series to provide a digit storage plane, each of said magnetic rods comprising a rod conductor having a circumferential anisotropic magnetic thin-film thereon;

a plurality of windings wound about the thin-film surface of said magnetic rods to provide digit positions in said memory for producing transverse magnetic fields at said digit positions;

selective circuit means for applying unipolar pulses having a predetermined repetition rate to at least a selected one of said windings in an operating cycle of the memory for producing a transverse uni-directional magnetic field in the magnetic thin-film in the area of said selected winding in response to said unipolar pulse; and a digital storage element coupled to the rod conductors of a digit storage plane, said digital storage element including means for receiving sense signals and supplying A.C. digital signals of one phase state or the other of opposite phase states and having the same repetition rate as said unipolar pulses to provide concurrent signals on alternate half cycles of said A.C. current, said digital signals producing an A.C. circumferential magnetic field in the magnetic thin-film of said magnetic rods whereby said magnetic thin-film at said selected digit position is responsive to concurrent transverse unidirectional and an A.C. circumferential magnetic fields to switch the magnetic thin-film in the area of the concurrent magnetic fields to store said digital data at said digit position.

11. The thin-film magnetic memory according to claim 10 in which the memory comprises a plurality of said digit storage planes and corresponding digital storage elements and predetermined windings on magnetic rods in different digit planes are serially interconnected for accessing a plurality of digit poistions comprising a word storage position in each operating cycle of the memory.

12. A thin-film magnetic memory for storing and accessing digital data in memory operating cycles comprising:

a three-dimensional array of magnetic rods, each of said magnetic rods comprising a rod conductor having a anisotropic magnetic thin-film surface thereon, said thin-film having a circumferential easy axis of magnetization and a transverse hard axis;

means for serially interconnecting magnetic rods in separate groups to provide digit planes;

a plurality of multi-turn solenoid windings wound about the thin-film surface of each of said magnetic rods at spaced intervals thereon to provide digit storage positions in said memory for storing digital data and accessing said data;

a plurality of parametric elements for storing binary digits according to the phase state of parametrical oscillations of a predetermined frequency, each of said parametric elements being coupled to a respective group of serially interconnected magnetic rod conductors of a respective digit plane for producing write A.C. digit currents in respective groups of rod conductors for producing A.C. magnetic fields at said digit positions, said A.C. digit current having phase information including one phase state for the binary digit "1" and another phase state for the binary digit "0";

read-write circuit means for producing a series of write-unipolar pulses each operating cycle of the memory including a write or restore operation and a series of delayed read-unipolar pulses each operating cycle including a read operation to produce properly timed sense signals, said unipolar pulses having the same repetition rate and timing as said parametric oscillations whereby said write-unipolar pulses and alternate half cycles of the A.C. digit current are coincident during said series of write-unipolar pulses; and selective circuit means for applying said series of unipolar pulses to any selected group of solenoid windings of respective digit planes comprising a word storage position for applying a series of transverse unidirectional magnetic fields to the thin-film at digit positions of the selected word position in response to said unipolar pulses, said magnetic thin-film at said selected group of digit positions being responsive to coincident unidirectional and A.C. magnetic fields to provide for rotational switching of said thin-film in one direction or the opposite direction along said easy axis to store said binary digits and responsive to only said transverse magnetic fields produced by said series of delayed read pulses only to induce said sense signals in the respective group of magnetic rod conductors of each digit plane, each of said sense signals being of said one phase state or other phase state and properly timed whereby parametrical oscillations of corresponding phase states are produced in parametric elements connected to respective groups of said rod conductors.

13. A thin-film magnetic memory comprising:

a plurality of storage positions, said storage positions comprising an anisotropic thin-film of ferromagnetic material having a preferred easy axis of magnetic domain orientation and a hard axis transverse to said easy axis;

storage position circuit means for producing orthogonal magnetic fields including an alternating magnetic field along said easy axis and a unidirectional magnetic field along said hard axis; and circuit means for applying a write A.C. signal of one phase state or another phase state and unipolar pulses of the same frequency as said write A.C. signal to said storage position circuit means to produce said alternating and unidirectional magnetic fields during alternate half cycles of said write A.C. signal, said storage position circuit means being constructed and arranged whereby said thin-film is responsive to concurrent magnetic fields during said alternate half cycles of the A.C. signal to produce switching of said thin-film by domain rotation in either one direction or another direction along the easy axis corresponding to the direction of the alternating magnetic field during said alternate half cycles of the A.C. signal.

14. The method of magnetically storing digital data which method comprises:

producing concurrent orthogonal magnetic fields about a magnetic element having an easy axis and a hard axis of magnetization, said orthogonal magnetic fields including an alternating magnetic field produced along said easy axis and having any one of a plurality of predetermined phase states, each phase state representing a respective one of a plurality of digits, and a unidirectional magnetic field produced along said hard axis, said unidirectional magnetic field being timed to be produced substantially within the time period of one half cycle of only alternate half cycles of said alternating magnetic field to produce said concurrent orthogonal magnetic fields only during at least one of said alternate half cycles, said concurrent orthogonal magnetic fields being capable of switching the direction of magnetization of said magnetic element to magnetically store digits on said magnetic element according to the direction of the alternating magnetic field during said alternate half cycles.

15. The method in accordance with claim 14 in which the magnetically stored digits are read by producing only said unidirectional magnetic field in the direction of said hard axis, said unidirectional magnetic field producing rotation of the direction of magnetization of the magnetic element toward the hard axis thereof to produce a varying magnetic field having a polarity which corresponds to the direction of magnetization of said magnetic element; and sensing said varying magnetic field and the polarity thereof to produce an alternating signal having one of said plurality of phase states corresponding to a respective one of said plurality of digits.

16. The method in accordance with claim 15 in which said unidirectional magnetic field is delayed in time to produce a phase shift of approximately 90° to compensate for phase shift produced during sensing of said varying magnetic field to produce said alternating signal.

17. The method of reading binary data magnetically stored in a bistable magnetic element, having an easy axis and a hard axis wherein magnetization in one direction or the opposite direction along said easy axis represents respective ones of said binary digits which method comprises:

producing a series of unipolar pulse magnetic fields having a high repetition frequency about said magnetic element;

sensing the component of change in the magnetic field along the hard axis of said magnetic element to produce an alternating current having a phase of 0 or pi radians depending upon the direction of change of said magnetic field along said hard axis; and applying said alternating current to a parametric element, capable of producing stable oscillation of a phase of at least 0 or pi radians, to control the phase of oscillation of said parametric element.

18. The method of reading data stored in an array of individual data storage positions provided by areas of magnetic thin film, each having a remanent easy axis of magnetization, which method comprises:

generating a train of read unipolar electrical pulses;

selectively applying said train of unipolar pulses to individual data storage positions of any selected group of storage positions to produce a corresponding first train of unidirectional magnetic fields having a direction transverse to said remanent easy axis of magnetization of respective magnetic thin film areas for said selected group, each of the magnetic thin film areas for said selected group of storage positions being responsive to said first train of magnetic fields to produce rotation of the direction of magnetization of the magnetic thin film areas of said selected group to produce a second train of magnetic fields at each storage position of said selected group, each second train of magnetic fields having a polarity dependent upon the orientation of the direction of magnetization of respective magnetic thin film areas along their easy axes; and individually detecting said second trains of magnetic fields produced at the storage positions of said selected group to produce trains of alternating sense signals, each train of sense signals having a phase corresponding to the direction of magnetization of the magnetic thin film areas of respective data storage positions of said selected group, wherein data is stored at any selected group of data storage positions by applying alternating current signals and a train of write unipolar pulses and individual pulses of said train of read unipolar pulses are delayed in time relative to write unipolar pulses to produce a 90° phase shift of said alternating sense signals produced in response to pulses of said train of read unipolar pulses whereby the phase of the alternating sense signals is adjusted to correspond to the phase of said alternating current signals.

References Cited

UNITED STATES PATENTS

| | | | |
|---|---|---|---|
| 3,276,001 | 10/1966 | Crafts | 340—174 |
| 2,856,596 | 10/1958 | Miller | 340—174 |
| 2,980,893 | 4/1961 | Muroga | 307—88 |
| 3,116,475 | 12/1963 | Oshima | 307—88 |
| 3,154,769 | 10/1964 | Blades | 340—174 |
| 3,182,296 | 5/1965 | Baldwin | 340—174 |

FOREIGN PATENTS 921,850 3/1963 Great Britain.

OTHER REFERENCES

"Parametron Thin Film Storage," IBM Technical Disclosure Bulletin, vol. 2, No. 6, April 1960.

"Cylindrical Magnetic Film Element," IBM Technical Disclosure Bulletin, vol. 5, No. 10, March 1963.

BERNARD KONICK, *Primary Examiner.*

IRVING L. SRAGOW, STANLEY URYNOWICZ, *Examiners.*

M. S. GITTES, *Assistant Examiner.*